(12) United States Patent
Donbrosky, Jr. et al.

(10) Patent No.: US 11,149,158 B2
(45) Date of Patent: Oct. 19, 2021

(54) DRY-ERASE COMPOSITIONS AND METHODS OF MAKING AND USING THEREOF

(71) Applicant: ICP Construction, Inc., Andover, MA (US)

(72) Inventors: Martin Douglas Donbrosky, Jr., Lambertville, MI (US); Rachel Ann Weber, Westland, MI (US)

(73) Assignee: ICP CONSTRUCTION, INC., Andover, MA (US)

( * ) Notice: Subject to any disclaimer, the term of this patent is extended or adjusted under 35 U.S.C. 154(b) by 219 days.

(21) Appl. No.: 16/301,981

(22) PCT Filed: May 19, 2017

(86) PCT No.: PCT/US2017/033465
§ 371 (c)(1),
(2) Date: Nov. 15, 2018

(87) PCT Pub. No.: WO2017/201362
PCT Pub. Date: Nov. 23, 2017

(65) Prior Publication Data
US 2019/0153250 A1     May 23, 2019

Related U.S. Application Data

(60) Provisional application No. 62/339,523, filed on May 20, 2016.

(51) Int. Cl.
| | | |
|---|---|---|
| C09D 11/16 | (2014.01) |
| C09D 163/10 | (2006.01) |
| C08G 59/50 | (2006.01) |
| B32B 27/38 | (2006.01) |
| B32B 33/00 | (2006.01) |
| B32B 27/20 | (2006.01) |
| B32B 27/34 | (2006.01) |
| B32B 27/26 | (2006.01) |
| B32B 7/12 | (2006.01) |
| B32B 21/06 | (2006.01) |
| B32B 37/24 | (2006.01) |

(52) U.S. Cl.
CPC .............. *C09D 11/16* (2013.01); *B32B 27/20* (2013.01); *B32B 27/26* (2013.01); *B32B 27/34* (2013.01); *B32B 27/38* (2013.01); *B32B 33/00* (2013.01); *C09D 163/10* (2013.01); *B32B 2037/243* (2013.01); *B32B 2266/0271* (2013.01); *C08G 59/50* (2013.01)

(58) Field of Classification Search
None
See application file for complete search history.

(56) References Cited

U.S. PATENT DOCUMENTS

| | | |
|---|---|---|
| 3,949,132 A | 4/1976 | Seregely et al. |
| 4,184,885 A | 1/1980 | Pasco et al. |
| 4,250,074 A | 2/1981 | Foscante et al. |
| 4,387,181 A | 6/1983 | Brown et al. |
| 4,525,216 A | 6/1985 | Nakanishi |
| 4,678,835 A | 7/1987 | Chang et al. |
| 4,786,558 A | 11/1988 | Sumiya et al. |
| 4,818,790 A | 4/1989 | Ooka et al. |
| 5,024,898 A | 6/1991 | Pitts et al. |
| 5,037,702 A | 8/1991 | Pitts et al. |
| 5,138,015 A | 8/1992 | Yagii et al. |
| 5,153,252 A | 10/1992 | Skora |
| 5,227,414 A | 7/1993 | Ernst et al. |
| 5,275,645 A | 1/1994 | Ternoir et al. |
| 5,310,611 A | 5/1994 | Okabe et al. |
| 5,338,793 A | 8/1994 | Loftin |
| 5,360,642 A | 11/1994 | Chandalia et al. |
| 5,412,021 A | 5/1995 | Nakanishi |
| 5,498,299 A | 3/1996 | Schmidt |
| 5,508,340 A | 4/1996 | Hart |
| 5,549,949 A | 8/1996 | Williams et al. |
| 5,618,860 A | 4/1997 | Mowrer et al. |
| 5,629,403 A | 5/1997 | Hicks et al. |
| 5,637,638 A | 6/1997 | Chandler et al. |
| 5,677,363 A | 10/1997 | Imagawa |
| 5,703,178 A | 12/1997 | Gasmena |
| 5,798,415 A | 8/1998 | Corpart et al. |

(Continued)

FOREIGN PATENT DOCUMENTS

| | | |
|---|---|---|
| AU | 55160/80 A | 8/1980 |
| CA | 2681983 A1 | 10/2008 |

(Continued)

OTHER PUBLICATIONS

Annex to Form PCT/ISA/206, Communication Relating to the Results of the Partial International Search for PCT/US2011/035396, 6 pages, dated Aug. 5, 2011.
COMEX, Sketch pintura para pizarron, (1 page), Mar. 15, 2012.
Communication pursuant to Article 94(3) EPC for 10150298.7, 5 pages (dated May 26, 2014).
European Search Report, 10150298.7, 3 pages, dated Mar. 23, 2012.
Extended European Search Report for EP 09798800.0, 9 pages (dated Mar. 1, 2012).
Extended European Search Report for EP 13738034.1, 6 pages (dated Sep. 2, 2015).
Extended European Search Report for EP 13765022.2, 5 pages (dated Sep. 2, 2015).

(Continued)

*Primary Examiner* — Sheeba Ahmed
(74) *Attorney, Agent, or Firm* — Fredrikson & Byron, P.A.

(57) ABSTRACT

The present disclosure provides, among other things, component parts that form curable compositions that are useful when forming dry-erase surface coatings and clear dry-erase surface coatings. In some embodiments, when a composition is extended on a substrate and cured, a surface coating or clear surface coating forms that demonstrates at least one dry-erase characteristic. The present disclosure also provides methods of forming and using such compositions.

25 Claims, 1 Drawing Sheet

(56) References Cited

U.S. PATENT DOCUMENTS

| | | |
|---|---|---|
| 5,852,111 A | 12/1998 | Watanabe et al. |
| 5,977,269 A | 11/1999 | Kovar et al. |
| 6,031,023 A | 2/2000 | Carroll et al. |
| 6,114,489 A | 9/2000 | Vicari et al. |
| 6,133,395 A | 10/2000 | Miyata et al. |
| 6,265,074 B1 | 7/2001 | Shah et al. |
| 6,277,485 B1 | 8/2001 | Invie et al. |
| 6,306,508 B1 | 10/2001 | Black et al. |
| 6,310,127 B1 | 10/2001 | Jablon |
| 6,326,437 B1 | 12/2001 | Tsuda et al. |
| 6,350,806 B1 | 2/2002 | Tsuda et al. |
| 6,379,001 B1 | 4/2002 | Tomida et al. |
| 6,383,651 B1 | 5/2002 | Weinert et al. |
| 6,423,418 B1 | 7/2002 | Callicott et al. |
| 6,476,965 B1 | 11/2002 | He et al. |
| 6,521,345 B1 | 2/2003 | Lewin |
| 6,541,552 B1 | 4/2003 | Tsuda et al. |
| 6,579,966 B1 | 6/2003 | Weinert et al. |
| 6,580,481 B2 | 6/2003 | Ueda et al. |
| 6,620,500 B2 | 9/2003 | Sweet et al. |
| 6,686,051 B1 | 2/2004 | Weinert et al. |
| 6,703,452 B2 | 3/2004 | Huynh-Ba |
| 6,767,591 B2 | 7/2004 | Meccia et al. |
| 6,878,414 B2 | 4/2005 | Meccia et al. |
| 7,001,952 B2 | 2/2006 | Faler et al. |
| 7,922,803 B2 | 4/2011 | Ito et al. |
| 8,309,653 B2 | 11/2012 | Goscha et al. |
| 9,227,459 B2 | 1/2016 | Goscha et al. |
| 9,493,029 B2 | 11/2016 | Nachtman et al. |
| 9,493,675 B2 | 11/2016 | Nachtman et al. |
| 2002/0058722 A1 | 5/2002 | Leenslag et al. |
| 2002/0072472 A1 | 6/2002 | Furuya et al. |
| 2003/0083416 A1 | 5/2003 | Kaufhold et al. |
| 2003/0216516 A1 | 11/2003 | Swarup et al. |
| 2004/0018345 A1 | 1/2004 | Athorn-Telep et al. |
| 2004/0019160 A1 | 1/2004 | Dai et al. |
| 2004/0077497 A1 | 4/2004 | Korane et al. |
| 2004/0081844 A1 | 4/2004 | Bharti et al. |
| 2004/0121080 A1 | 6/2004 | Urscheler et al. |
| 2005/0112324 A1 | 5/2005 | Rosenbaum et al. |
| 2005/0148752 A1 | 7/2005 | Klaassens et al. |
| 2005/0154170 A1 | 7/2005 | Klaassens et al. |
| 2005/0158113 A1 | 7/2005 | Wehmeyer |
| 2005/0281999 A1 | 12/2005 | Hofmann et al. |
| 2006/0024461 A1 | 2/2006 | Gustafson et al. |
| 2006/0024463 A1 | 2/2006 | Gustafson et al. |
| 2006/0024504 A1 | 2/2006 | Nelson et al. |
| 2006/0122319 A1 | 6/2006 | Kneafsey et al. |
| 2006/0228470 A1 | 10/2006 | He et al. |
| 2006/0287217 A1 | 12/2006 | Keilman et al. |
| 2007/0072989 A1 | 3/2007 | Piret et al. |
| 2007/0091073 A1 | 4/2007 | Nakata et al. |
| 2007/0142517 A1 | 6/2007 | Anderson et al. |
| 2007/0149656 A1 | 6/2007 | Rayner |
| 2007/0167324 A1 | 7/2007 | Juang |
| 2007/0213492 A1 | 9/2007 | Mowrer et al. |
| 2008/0021153 A1 | 1/2008 | Jeon et al. |
| 2008/0286744 A1 | 11/2008 | Cheris et al. |
| 2008/0318064 A1 | 12/2008 | Outlaw et al. |
| 2009/0148603 A1 | 6/2009 | Goscha |
| 2009/0155462 A1 | 6/2009 | Flosbach et al. |
| 2009/0293768 A1 | 12/2009 | Atsuchi et al. |
| 2010/0151144 A1 | 6/2010 | Guo et al. |
| 2010/0181005 A1 | 7/2010 | Schneider |
| 2011/0003098 A1* | 1/2011 | Wen .................. C03C 17/008 428/34.7 |
| 2011/0098394 A1 | 4/2011 | Schmeltzer et al. |
| 2011/0300294 A1 | 12/2011 | Nachtman et al. |
| 2012/0094129 A1* | 4/2012 | Temple ............... C09D 175/16 428/413 |
| 2013/0029311 A1 | 1/2013 | Goscha |
| 2015/0018455 A1 | 1/2015 | Nachtman et al. |
| 2015/0184021 A1 | 7/2015 | Nachtman et al. |
| 2015/0314635 A1 | 11/2015 | Goscha et al. |

FOREIGN PATENT DOCUMENTS

| | | |
|---|---|---|
| CA | 2689732 A1 | 7/2010 |
| CN | 1402755 A | 3/2003 |
| DE | 102006056690 A1 | 1/2008 |
| EP | 0414375 A1 | 2/1991 |
| EP | 0659791 B1 | 6/1995 |
| EP | 0835889 A1 | 4/1998 |
| EP | 2208766 A2 | 7/2010 |
| JP | S57-128488 U | 8/1982 |
| JP | H04-148925 A | 5/1992 |
| JP | H06-344655 A | 12/1994 |
| JP | H09-071720 A | 3/1997 |
| JP | 10-000896 | 1/1998 |
| JP | 10-203084 | 8/1998 |
| JP | 2000-178504 A | 6/2000 |
| JP | 2001-011140 A | 1/2001 |
| JP | 2002-539320 A | 11/2002 |
| JP | 2003-003121 A | 1/2003 |
| JP | 2005-537358 A | 12/2005 |
| JP | 2007-031485 A | 2/2007 |
| JP | 2010-158892 A | 7/2010 |
| JP | 2011-528612 A | 11/2011 |
| WO | WO-00/55269 A1 | 9/2000 |
| WO | WO-01/34714 A | 5/2001 |
| WO | WO-2002/034849 | 2/2002 |
| WO | WO-2004/020221 A1 | 3/2004 |
| WO | WO-2004/021379 A2 | 3/2004 |
| WO | WO-2006/044376 A1 | 4/2006 |
| WO | WO-2009/009273 A1 | 1/2009 |
| WO | WO-2009/011694 A1 | 1/2009 |
| WO | WO-2009/029512 A2 | 3/2009 |
| WO | WO-2010/009384 A1 | 1/2010 |
| WO | WO-2011/163175 A1 | 12/2011 |
| WO | WO-2013/110046 A1 | 7/2013 |
| WO | WO-2013/141958 A1 | 9/2013 |
| WO | WO-2017/201362 A1 | 11/2017 |

OTHER PUBLICATIONS

First Office Action for CN 200980136576.8, 12 pages (dated Dec. 4, 2012).

International Search Report and Written Opinion for PCT/US2007/073524, 8 pages (dated Apr. 1, 2009).

International Search Report for PCT/US17/33465, 3 pages, dated Aug. 11, 2017.

International Search Report for PCT/US2009/050976, 2 pages (dated Aug. 27, 2009).

International Search Report for PCT/US2011/035396, 6 pages (dated Oct. 12, 2011).

International Search Report for PCT/US2013/022428, 4 pages (dated May 15, 2013).

International Search Report for PCT/US2013/022429, 5 pages (dated May 15, 2013).

Material Safety Data Sheet, EeZeClean Dry Erase Cure, Date Prepared Nov. 22, 2011, No. EZ50080, Precision Coating, (3 pages).

Material Safety Data Sheet, EeZeClean Dry Erase, Date Prepared Nov. 22, 2011, No. EZ51000, Precision Coatings, (3 pages).

Material Safety Data Sheet, PSX 700 CURE Date Issued Dec. 7, 2006, Edition No. 3, PPG Industries, Inc. (3 pages).

Material Safety Data Sheet, PSX 700 Neutral Tint Resin, Date of Issue Mar. 25, 2010, Version 9.01, Code PX700T3, PPG Industries, Inc. (7 pages).

Material Safety Data Sheet, SEM-SPECLT QT 4PK Dry Erase Base, Identification 241118, revision date Nov. 28, 2011 (5 pages).

Material Safety Data Sheet, Speclt HP 6PK Dry Erase Activator, Identification 241119, revision date Oct. 20, 2011 (5 pages).

Material Safety Data Sheet, Whitey board, Think out loud, (2 pages), Jan. 2012.

Material Safety Data Sheet-Part A and B, Wink wallsloveink.com, (12 pages), Date of Preparation Jan. 1, 2011.

Office Action for JP2011-518933 dated Mar. 22, 2013 (3 pages). [English translation].

Paint Description, Whitey board, Think out loud, (1 page).

Paquepintes, (1 page), Mar. 15, 2012.

(56) References Cited

OTHER PUBLICATIONS

PPG Amercoat, PSX® 700, Product Data/Application Instructions, PPG Protective & Marine Coatings (4 pages).
PPG Amercoat, Psx® 700A Clear Coat, Product Data/Application Instructions, PPG Protective & Marine Coatings (2 pages).
Precision Coating, Fact Sheet, Precision EeZeClean Dry Erase Coating, Feb. 2012, (1 page).
Precision Coating, Technical Product Data, Precision EeZeClean Dry Erase Coating, Feb. 2012, (2 pages).
Resene Write-on Wall Paint, Resene, Dec. 2009, (2 pages).
Scribi Whiteboard verf Gamma, (1 page), Mar. 15, 2012.
Second Office Action for CN 200980136576.8, 32 pages (dated Oct. 18, 2013).
Write Up Dry Erase Paint, writeUp h2o fact sheet, (1 page).
Written Opinion for PCT/US/2009/050976, 7 pages (dated Aug. 27, 2009).
Written Opinion for PCT/US17/33465, 9 pages, dated Aug. 11, 2017.
Written Opinion for PCT/US2011/035396, 11 pages (dated Oct. 12, 2011).
Written Opinion for PCT/US2013/022428, 7 pages (dated May 15, 2013).
Written Opinion for PCT/US2013/022429, 6 pages (dated May 15, 2013).
Written Opinion for SG 201100316-7, 10 pages (dated Nov. 21, 2012).

\* cited by examiner

DRY-ERASE COMPOSITIONS AND METHODS OF MAKING AND USING THEREOF

CROSS-REFERENCE TO RELATED APPLICATIONS

The present application claims the benefit of priority of U.S. patent application No. 62/339,523, filed on May 20, 2016, the contents of which is hereby incorporated by reference in its entirety for all purposes herein.

BACKGROUND

Dry-erase products allow their users to write on a surface and then easily remove the writing, through multiple cycles. Such products have proven highly popular with and attractive to consumers, but many demonstrate inferior properties.

SUMMARY

Among other things, the present disclosure provides compositions. In some embodiments, such compositions when applied to a surface form surface coatings that exhibit dry-erase characteristics and properties. The present disclosure, in some embodiments, also provides methods of making and using compositions and dry-erase products therefrom.

The present disclosure provides an insight that provided dry-erase compositions are useful to generate coatings with appropriate hydrophobicity. In some embodiments, a degree of hydrophobicity is desirable on a dry-erase product or on a dry-erase surface coating to provide sufficient chemical resistance to penetration from dry-erase marker or their additives, dyes, pigments, or solvents.

The present disclosure provides that dry-erase compositions that are useful to generate coatings characterized by particular dry-erase characteristics are stable in the presence of opacifying agents or pigments. In some embodiments, opacifying agents or pigments are useful to generate coatings having color, such as white and that exhibit dry-erase characteristics and properties.

The present disclosure also provides a surprising finding that dry-erase compositions that are useful to generate coating characterized by particular dry-erase characteristics are sufficiently stable independent of presence or level of a pigment or an opacifying agent, and particularly of a titanium oxide opacifying agent. The present disclosure also provides that dry-erase compositions without such pigments or opacifying agents are useful to generate coatings characterized by particular dry-erase characteristics and are sufficiently stable with respect to those dry-erase characteristics that they maintain such characteristics. The present disclosure demonstrates that dry-erase compositions without such pigments or opacifying agents surprisingly demonstrate one or more similar dry-erase characteristics to those observed in an otherwise-identical opacifying-agent-containing composition. In some embodiments, dry-erase compositions without pigments or opacifying agents have an additional desirable attribute in that they can cure to form a clear coating. In some embodiments, such a clear coating can convert a surface of any color into a write-erase surface.

In some embodiments, provided compositions comprise component parts. In some embodiments, compositions provided herein include multiple component parts. In some embodiments, compositions provided herein include multiple component parts that are separately kept until ready for application of a composition on a substrate. In some embodiments, provided compositions comprise a resin part and a cure part.

In some embodiments, compositions are prepared by combining a resin part and a cure part. In some embodiments, provided compositions are designed including a resin part and a cure part that are selected such that, when combined together, they form a curable composition. In some embodiments, such curable compositions are characterized in that when they applied to a substrate, they cure to form a surface coating that demonstrates at least one dry-erase characteristic.

In some embodiments, the present disclosure relates to compositions that include an epoxy-based resin part. Epoxies are generally known in the coating industry for their chemical resistance, environmental compatibility, hardness (e.g. impact and abrasion resistance), reactivity, and radiation resistance (e.g. ultraviolet radiation resistance). The present disclosure provides particular insights with respect to a resin part that is or comprises an epoxy acrylate. In some embodiments, a resin part is or comprises an epoxy acrylate. In some embodiments, an epoxy acrylate is for example a bisphenol A-based epoxy acrylate.

In some embodiments, a resin part is characterized by an epoxy equivalent weight (EEW or WPE). In some embodiments, an equivalent weight is the amount of reactive epoxy groups by weight. In some embodiments, an equivalent weight is the amount of reactive epoxy groups and/or reactive acrylate groups by weight. In some embodiments, a resin part has an epoxy equivalent weight in a wide range depending on the epoxy ingredients or epoxy and acrylate ingredients in the resin part.

In some embodiments, the present disclosure relates to compositions that include an amine-containing cure part or is cure part that has or comprises amine functional groups. In some embodiments, an amine is or comprises an aliphatic amine. In some embodiments, an aliphatic amine is a cycloaliphatic amine. In some embodiments, a cure part includes an amine and a phenol. In some embodiments, a cure part includes an amine that is functionalized with a phenol. In some embodiments, a phenol is or comprises a nonyl-phenol. In some embodiments, a cure part is characterized by an amine hydrogen equivalent weight (AHEW). In some embodiments, an equivalent weight is the amount of reactive amine hydrogen by weight.

In some embodiments, when a cure part is mixed with a resin part, a resulting composition has an amine to epoxy acrylate equivalent weight ratio depending on an EEW and AHEW of its component parts.

In some embodiments, provided compositions are engineered to be thermodynamically stable. In some embodiments, provided compositions specifically include component parts and ratios of component parts that designed to be thermodynamically stable.

In some embodiments, when combined together according to an equivalent weight ratio, epoxy acrylate and amine-containing compositions cure after being applied to a substrate and form dry-erase surface coatings. In some embodiments, provided compositions that are capable of curing to form a surface coating having dry-erase characteristics are characterized by an amine to epoxy acrylate equivalent weight having a value in a range of about 0.4 to about 1.7.

In some embodiments, an amine to epoxy equivalent weight ratio value for provided compositions that form a dry-erase surface coating has a tolerance level and/or an error margin. In some embodiments, when a resin part and cure part are combined having an equivalent weight ratio that differs, so that a value of an equivalent weight ratio is outside a tolerance level and/or an error margin, such a combination may result in an exothermic or even a violently exothermic reaction. In some embodiments, a tolerance level and/or an error margin is less than about 15%. In some embodiments, when a ratio of amine to epoxy acrylate differs from its amine to epoxy acrylate equivalent weight ratio value by more than 15% such a combination may result in an exothermic or even a violently exothermic reaction.

The present disclosure encompasses a recognition that certain problems exist with surface coatings that have dry-erase character. Among other things, the present disclosure identifies challenges in providing materials with sufficient hydrophobicity to achieve dry-erase character (e.g., resistance to penetration from marker solvents and/or pigments) that do not include unacceptably high (i.e., above 100 g/L, or even 140 g/L) levels of VOCs.

In some embodiments, the present disclosure specifically provides epoxy acrylate-containing compounds that cure to form dry-erase surface coatings and that contain less than about 140 g/L. In some embodiments, the present disclosure specifically provides epoxy acrylate-containing compounds that cure to form dry-erase surface coatings and that contain less than about 100 g/L. In some embodiments, the present disclosure specifically provides epoxy acrylate-containing compounds that cure to form dry-erase surface coatings and that contain less than about 25 g/L. In some embodiments, the present disclosure specifically provides epoxy acrylate-containing compounds that cure to form dry-erase surface coatings and that contain about 0 g/L.

In some embodiments, when extended on a substrate, provided compositions cure to form a surface coating. In some embodiments, when combined and extended on a substrate, provided compositions cure under ambient conditions to form a surface coating. In some embodiments, when combined and extended on a substrate, provided compositions are energy cured to form a surface coating. In some embodiments, energy curing includes, for example, applying heat or another form of radiation. In some embodiments, such a surface coating is characterized in that it demonstrates at least one dry-erase characteristic.

In some embodiments, provided epoxy acrylate-containing compositions cure after being applied to a substrate and form dry-erase surface coatings. In some embodiments, such surface coatings are characterized in that when marked with a dry-erase or write-erase marking material, such surface coatings are capable of receiving those marks. Specifically, in some embodiments, dry-erase surface coatings that easily receive marks and which marks are characterized in that they smooth, solid, uniform, and do not either run or bead.

In some embodiments, provided epoxy acrylate-containing compositions cure after being applied to a substrate and form dry-erase surface coatings. In some embodiments, such surface coatings are characterized in that when marked with a dry-erase or write-erase marking material, marks on such surface coatings can be erased to be effectively invisible, resulting in little or no ghosting, even for example after prolonged normal use. In some embodiments, prolonged normal use is characterized by a cycle, including writing on a dry-erase surface and erasing such marks so its dry-erase surface is effectively invisible. In some embodiments, prolonged normal use is characterized by multiple repeated write and erase cycles. In some embodiments, provided epoxy acrylate-containing compounds cure to form dry-erase surface coatings that maintain their dry-erase character after about 10 cycles, after about 50 cycles, after about 100 cycles, after about 500 cycles, after about 1,000 cycles, after about 2,000 cycles, after about 3,000 cycles, after about 4,000 cycles, after about 5,000 cycles, after about 6,000 cycles, after about 7,000 cycles, after about 8,000 cycles, or after about 9,000 cycles of writing and erasing at the same position.

In some embodiments, provided epoxy acrylate-containing compounds show desired performance in specific dry-erase tests. In some embodiments, provided epoxy acrylate-containing compounds cure to a dry-erase surface characterized by one or more of (1) average surface roughness (Ra) of less than about 7,500 nm; (2) a maximum surface roughness (Rm) of less than about 10,000 nm; (3) a 60 degree gloss of higher than 0; (4) a contact angle of less than about 150 degrees; (5) a porosity of less than about 45 percent; (6) an elongation at break of between about 10 percent and about 100 percent; (7) a Sward hardness of greater than about 3; (8) a Taber abrasion value of less than about 150 mg/thousand cycles; (9) a sag resistance of between about 4 mils and about 24 mils; and/or a pencil hardness of 6B or harder. In some embodiments, a "dry-erase"/"write-erase" material as described herein is characterized by a soak time as defined herein of at least about 4. In some embodiments, a "dry-erase"/"write-erase" material as described herein is characterized by one or more of the characteristics described herein.

In some embodiments, a composition as provided herein may include other additives. In some embodiments, a composition may include a catalyst. In some embodiments, a resin part of a composition as provided herein may include a catalyst. In some embodiments, a cure part of a composition as provided herein may include a catalyst. In some embodiments, no catalyst is present in a resin part, a cure part or any combination.

In some embodiments, provided compositions are white. In some embodiments, provided compositions have color. In some embodiments, provided compositions include an opacifying agent or pigment. In some embodiments, provided compositions are clear and free of an opacifying agent or pigment.

The present disclosure also provides dry-erase products made from provided compositions. In some embodiments, dry-erase products are made by or manufactured from provided compositions.

The present disclosure also provides methods of forming a dry-erase product. In some embodiments, provided methods include steps of combining a resin part and a cure part to form a curable composition as described herein, so that when applying the curable composition to a substrate, it forms a surface coating that cures under ambient conditions and is characterized in that it demonstrates at least one dry-erase characteristic.

The present disclosure also provides dry-erase products, which in some embodiments, are made according to provided methods.

BRIEF DESCRIPTION OF THE DRAWING

The drawing is for illustration purposes only, not for limitation.

DEFINITIONS

Figure 1:
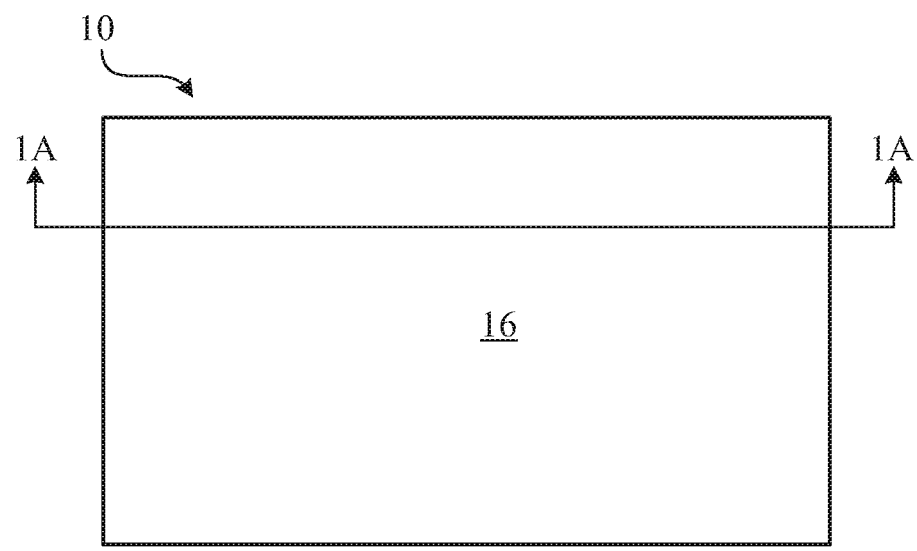
FIG. 1 depicts a top view of a dry-erase product.

In order for the present disclosure to be more readily understood, certain terms are first defined below. Additional definitions for the following terms and other terms are set forth throughout the specification.

In this application, unless otherwise clear from context, the term "a" may be understood to mean "at least one." As used in this application, the term "or" may be understood to mean "and/or." In this application, the terms "comprising" and "including" may be understood to encompass itemized components or steps whether presented by themselves or together with one or more additional components or steps. Unless otherwise stated, the terms "about" and "approximately" may be understood to permit standard variation as would be understood by those of ordinary skill in the art. Where ranges are provided herein, the endpoints are included. As used in this application, the term "comprise" and variations of the term, such as "comprising" and "comprises," are not intended to exclude other additives, components, integers or steps.

"About" or "Approximately": as used herein, the terms "about" and "approximately" are used as equivalents. Any numerals used in this application with or without about/approximately are meant to cover any normal fluctuations appreciated by one of ordinary skill in the relevant art. In some embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

"Acrylate": as used herein, the term "acrylate" refers to a salt or ester of an acrylic acid, $CH_2=CHCO_2H$.

"Alkoxy": as used herein, the term "alkoxy" refers to an —O— alkyl group. Examples of alkoxy groups include: methoxy, ethoxy, propoxy (e.g., n-propoxy and isopropoxy), t-butoxy, and the like.

"Alkoxylate": as used herein, the term "alkoxylate" refers to an alkyl-C(O)O. Examples of alkoxylates include: acetate, stearate, and the like.

"Alkyl" as used herein, the term "alkyl" refers to a saturated or unsaturated hydrocarbon containing 1-20 carbon atoms including both acyclic and cyclic structures (such as methyl, ethyl, propyl, isopropyl, butyl, iso-butyl, sec-butyl, pentyl, hexyl, cyclopropyl, cyclobutyl, cyclopentyl, cyclohexyl, propenyl, butenyl, cyclohexenyl, and the like). A linking divalent alkyl group is referred to as an "alkylene" (such as ethylene, propylene, and the like).

"Ambient conditions": as used herein, the term "ambient conditions" refers to nominal, earth-bound conditions as they exist at sea level at a temperature of about 45-130° F. Typically, ambient conditions include a temperature within the range of 20-25° C., and a pressure around 100 kPa.

"Aralkyl": as used herein, the term "aralkyl" refers to alkyl substituted by aryl. An example of an aralkyl group is benzyl.

"Aryl": as used herein, the term "aryl" refers to monocyclic or polycyclic (e.g., having 2, 3, or 4 fused rings) aromatic hydrocarbons such as, phenyl, naphthyl, anthracenyl, phenanthrenyl, indanyl, indenyl, and the like. In some embodiments, aryl groups have from 6 to 20 carbon atoms, from 6 to 15 carbon atoms, or from 6 to 10 carbon atoms.

"Curing": as used herein, the term "curing" as used herein, refers to a process of setting (e.g., by evaporation (drying) and/or cross-linking) a material to form a surface coating on a substrate. In some embodiments, curing includes and/or is performed by exposure to ambient conditions, heat, radiation, and/or by cross-linking (e.g., oxidative cross-linking).

"Dry-erase"/"Write-erase": as used herein, the term "dry-erase"/"write-erase", refers to a product or material described herein is considered to be a "dry-erase" or "write-erase", which terms are used interchangeably, if it is characterized in that it can be written on using a marking materials as discussed below, and such writing can be removed substantially completely with minimal effort and without the use of an applied solvent. In some embodiments, a material is considered to be "write-erase" or "dry-erase" if a marking material can be erased from the material to be effectively invisible, resulting in little or no ghosting, even after prolonged normal use, for example, after about 10 cycles (e.g., after about 50 cycles, after about 100 cycles, after about 500 cycles, after about 1,000 cycles, after about 2,000 cycles, after about 3,000 cycles, after about 4,000 cycles, after about 5,000 cycles, after about 6,000 cycles, after about 7,000 cycles, after about 8,000 cycles, or after about 9,000 cycles) of writing and erasing at the same position and/or have desired performance in specific write-erase tests. In some embodiments, a "dry-erase"/"write-erase" material as described herein is characterized by one or more of: (1) average surface roughness (Ra) of less than about 7,500 nm; (2) a maximum surface roughness (Rm) of less than about 10,000 nm; (3) a 60 degree gloss of higher than 0; (4) a contact angle of less than about 150 degrees; (5) a porosity of less than about 45 percent; (6) an elongation at break of between about 10 percent and about 200 percent; (7) a Sward hardness of greater than about 3; (8) a Taber abrasion value of less than about 150 mg/thousand cycles; (9) a sag resistance of between about 4 mils and about 24 mils; and/or a pencil hardness of 6B or harder. In some embodiments, a "dry-erase"/"write-erase" material as described herein is characterized by a soak time as defined herein of at least about 4. In some embodiments, a "dry-erase"/"write-erase" material as described herein is characterized by one or more of the characteristics described herein.

"Determine": Many methodologies described herein include a step of "determining". Those of ordinary skill in the art, reading the present specification, will appreciate that such "determining" can utilize or be accomplished through use of any of a variety of techniques available to those skilled in the art, including for example specific techniques explicitly referred to herein. In some embodiments, determining involves manipulation of a physical sample. In some embodiments, determining involves consideration and/or manipulation of data or information, for example utilizing a computer or other processing unit adapted to perform a relevant analysis. In some embodiments, determining involves receiving relevant information and/or materials from a source. In some embodiments, determining involves comparing one or more features of a sample or entity to a comparable reference.

"Effectively invisible": as used herein, the term "effectively invisible" refers to a color difference Delta E (ΔE) of less than 20 as calculated according to the ASTM Test Method D2244 before and after a mark is erased by an eraser.

"Epoxy": as used herein, the term "epoxy" refers to a polyepoxide polymer, including monomers or short chain polymers with an epoxide group at either end.

"Halo": as used herein, the term "halo" includes reference to any of the following: fluoro, chloro, bromo, and iodo.

"Heteroaryl": as used herein, the term "heteroaryl" refers to an aromatic heterocycle having at least one heteroatom ring atom such as sulfur, oxygen, or nitrogen. Heteroaryl groups include monocyclic and polycyclic (e.g., having 2, 3, or 4 fused rings) systems. Examples of heteroaryl groups include without limitation, pyridyl, furyl, quinolyl, indolyl, oxazolyl, triazolyl, tetrazolyl, and the like. In some embodiments, the heteroaryl group has from 1 to 20 carbon atoms (e.g., from 3 to 20 carbon atoms). In some embodiments, the heteroaryl group has 1 to 4 heteroatoms (e.g., 1 to 3, or 1 to 2 heteroatoms).

"Oxyalkylene": as used herein, the term "oxyalkylene" refers to an —O— alkylene group.

"Polyol": as used herein, the term "polyol" refers to a moiety that includes at least two hydroxyl (—OH) groups. The hydroxyl groups can be terminal and/or non-terminal. The hydroxyl groups can be primary hydroxyl groups.

"Polyurethane": as used herein, the term "polyurethane" refers to a polymeric or oligomeric material that includes a urethane linkage in its backbone.

"Solvent-based": as used herein, the term "solvent-based" refers to compositions including solvents, where the solvents in the composition are predominantly organic solvents. Such organic solvents may be used either in their anhydrous or wet form unless specified otherwise. In some embodiments, the term is particularly applied to liquid compositions.

"Solventless": as used herein, the term "solventless" refers to compositions in which solvents are present at a level below about 1% by weight/volume of the liquid coating composition before application to a substrate. In some embodiments, the term is particularly applied to liquid compositions.

"Substantially solventless": as used herein, the term "substantially solventless" refers to compositions in which solvents are present at a level below about 10%, and in some embodiments, below about 5% by weight/volume of the composition. In some embodiments, the term is particularly applied to liquid compositions.

"Substantially invisible": as used herein, the term "substantially invisible" refers to a color difference Delta E (ΔE) of less than 10 as calculated according to the ASTM Test Method D2244 before and after a mark is erased by an eraser.

"Substituted": as used herein, the term "substituted" refers to a chemical compound having a structure identical to that of a reference compound except that one or more moieties of the reference compound has been "substituted" with a substituent moiety. In some embodiments, the structures of the substituted compound and reference compound are identical except that one or more hydrogen atoms in the reference compound has been substituted with a substituent moiety. In some embodiments, a substituent moiety can be any chemical entity that can bond to the rest of the molecule consistent with rules of chemical bonding. In some embodiments, a substituent moiety has fewer than 100, 95, 90, 85, 80, 75, 70, 65, 60, 55, 50, 45, 40, 35, 30, 25, 20, 15, 10 atoms.

DETAILED DESCRIPTION OF CERTAIN EMBODIMENTS

The present disclosure, among other things, relates to compositions useful in forming dry-erase surface coatings, dry-erase products that include such surface coatings (e.g. whiteboards), materials that cure to form such surface coatings, and methods of making and using the same.

Generally, when applied to a substrate and cured, compositions as provided herein form surface coatings that demonstrate at least one dry-erase characteristic. The present disclosure further provides compositions prepared by combining an epoxy-based part resin and a cure part, so that when they are combined and extended on a substrate such a combination cures to form a surface coating that demonstrates at least one dry-erase characteristic.

In some embodiments, a dry-erase product includes a cured surface coating, for example, a cross-linked coating extending upon a substrate and having a dry-erase surface.

In some embodiments, compositions, surface coatings, and/or dry-erase products can be formed from one or more parts (e.g., components) each part independently including one or more ingredients. In accordance with the present disclosure, in some embodiments, one part is a resin part and one part is a cure part. In some embodiments, a resin part contains at least one epoxy. In some embodiments, an epoxy or epoxy-containing material can be provided as a solid resin, or in a solvent-based carrier. For example, compositions and/or components comprising them can be provided as liquids, solids, or any combination thereof (powders, solutions, suspensions, mixtures, etc.).

In some embodiments, a composition is applied to the surface as a substantially solventless liquid composition, wherein the liquid carrier is a combination of liquid and solid starting materials, but does not include and/or does not require addition of, an organic solvent (such as an alcohol, acetone, ketone, or other organic solvent). Alternatively or additionally, in some embodiments, such a composition does not contain and/or does not require addition of more than about 10% by weight of water. In some embodiments, a composition as provided herein can be applied to a substrate and cured while on a substrate under ambient conditions.

In some embodiments, provided surface coatings are produced from one or more materials in an essentially solventless, or substantially solventless system as defined herein.

In some embodiments, one or more materials that form surface coatings that emit minimal volatile organic compounds ("VOCs") after curing on a substrate. For example, in some embodiments, cured surface coatings include less than about 25 g/L, less than about 100 g/L, or less than about 140 g/L of VOCs.

In some embodiments, an epoxy-compound or epoxy-compound-containing material comprises an acrylate. In some embodiments, an epoxy-compound or epoxy-compound-containing material comprises epoxy groups, epoxide groups, or acrylate groups. In some embodiments, an epoxy or epoxy-containing material comprises epoxy groups, epoxide groups, and acrylate groups. In some embodiments, an epoxy acrylate or epoxy acrylate-containing material can be provided as a solid resin, or in a solvent-based carrier. For example, in some embodiments, an epoxy and/or compositions comprising them can be provided as liquids, solids, or any combination thereof (powders, solutions, suspensions, mixtures, etc.).

The present disclosure exemplifies compositions comprising at least two parts including an epoxy-based resin compound. In some embodiments, compositions are generated by combining at least one resin part and at least one cure part, the cure part including one or more amine compounds.

In some embodiments, after a resin part and a cure part are mixed together and extended on a substrate, they form a composition that can be applied to the surface of a substrate to generate a surface coating that cures to form a dry-erase surface. In some embodiments, a cure part has an effect of hardening a composition. In some embodiments, after curing, a surface coating is hard and smooth and substantially non-porous so that it can be marked with a marking material including a colorant and a solvent, and thereafter, the marking material can be erased from a dry-erase surface to be effectively invisible (e.g., substantially invisible). Without wishing to be bound to a specific theory, it is believed curing occurs by cross-linking or other chemical and physical processes.

In some embodiments, provided surface coatings form by curing cure under ambient conditions. In some embodiments, provided surface coatings cure faster and/or more completely in a presence of light, heat, and/or other types of radiation.

In some embodiments, resulting surface coatings have many desirable attributes, including for example: low porosity, low surface roughness, high elongation at break, high Taber abrasion resistance, and high Sward hardness. In some embodiments, after a dry-erase surface is marked with a marking material including a colorant and a solvent, a dry-erase mark can be erased from a dry-erase surface to be effectively invisible (e.g., substantially invisible). Generally, while not intending to be bound by any theory, it is believed that low porosity of provided surface coatings makes them substantially impervious to marking materials, while low surface roughness prevents marking materials from becoming entrapped on a surface or in a surface and beyond effective reach of an eraser.

In some embodiments, dry-erase surface coatings and dry-erase products provided herein, when marked with a marking material, a marking material can be erased to be effectively invisible (e.g., substantially invisible) with little or no ghosting, even after prolonged and repeated use. In some embodiments, provided compositions that are prepared by combining resin and cure parts and extended on a substrate as disclosed herein, form dry-erase surface coatings and dry-erase products that when marked with a marking material, a marking material can be erased to be effectively invisible (e.g., substantially invisible) with little or no ghosting, even after prolonged and repeated use.

Compositions

In some embodiments, a dry-erase product or dry-erase surface coating is formed from an uncured composition. In some embodiments, an uncured composition is applied or extended upon a substrate and then cured. In some embodiments, compositions are multi-component systems (e.g., a two-part system). A two-part system, for example, consists of two separate parts that are mixed, upon demand and when desired, to obtain a final liquid composition prior to its application on a substrate. In some embodiments, a composition and/or its parts (e.g. a resin part and a cure part) will not cure if denied light and sealed in a substantially air-free container. In some embodiments, a one-component system, for example, consists of a composition packaged to be ready for use.

In some embodiments, compositions, in general, can include a resin part, a cure part, and/or other components or as starting materials, which are described in further detail herein below.

Resin Part

In some embodiments, a resin part is or comprises a compound or material including epoxy functional groups. In some embodiments, a resin part is or comprises a compound or material including acrylate functional groups. In some embodiments, a resin part is or comprises a compound or material including epoxy acrylate functional groups. In some embodiments, a catalyst can be combined and packaged with a resin part prior to mixing with a cure part.

Epoxy Functional Groups

In some embodiments, compositions, dry-erase surface coatings, or dry-erase products can be formed from a resin part that includes an epoxy material.

In some embodiments, epoxy resins can include polyether chains that contain one or more epoxide units in their structure. Polyethers have the repeating oxyalkylene units: alkylene substituted by oxygen groups, (e.g., ethyleneoxy ($-[CH_2-CH_2O]-$)).

In some embodiments, the polyether chains can have additional functional groups such as hydroxyl (—OH).

In some embodiments, epoxy resins can contain an aliphatic (such as cyclic or acyclic) or an aromatic backbone or a combination of both. In some embodiments, epoxy resins can contain other non-interfering chemical linkages (such as alkyl chains).

In some embodiments, epoxy resins include compounds containing epoxide functional groups, such as epoxies, epoxides, oxiranes, and ethoxylines. In some embodiments, epoxy, epoxide, oxirane serves as primary reactive functional groups. In some embodiments, epoxy resins contain hydroxyl (—OH) groups that may serve as reactive groups in addition to or in place of epoxy groups.

In some embodiments, epoxide resins useful in forming compositions of the present disclosure invention are non-aromatic hydrogenated resins which contain more than one 1,2-epoxy groups per molecule and more preferably two 1,2-epoxy groups per molecule. In some embodiments, epoxide resins generally contain glycidyl ester or glycidyl other groups and such resins have a weight per epoxide of from 100 to 2000. In some embodiments, epoxide resins may be saturated or unsaturated, aliphatic, cycloaliphatic, or heterocyclic.

In some embodiments, exemplary epoxide resins are non-aromatic hydrogenated cyclohexane dimethanol and diglycidyl ethers of hydrogenated Bisphenol A-type epoxide resin, such as Epon DPL-862, Eponex 1510, Heloxy 107 and Eponex 1513 (hydrogenated bisphenol A-epichlorohydrin epoxy resin) from Shell Chemical in Houston, Tex.; Santo-link LSE-120 from Monsanto located in Springfield, Mass.; Epodil 757 (cyclohexane dimethanol diglycidylether) from Pacific Anchor located in Allentown, Pa.; Araldite XUGY358 and PY327 from Ciba Geigy located in Hawthorne, N.Y.; Epirez 505 from Rhone-Poulene located in Lousiville, Ky.; Aroflint 393 and 607 from Reichold located in Pensacola, Fla.; and ERL4221 from Union Carbide located in Tarrytown, N.Y.; and ChemRes® 628 from Cargill located in Minneapolis, Minn.

In some embodiments, other suitable non-aromatic epoxy resins include DER 732 and DER 736. Such non-aromatic hydrogenated epoxide resins are desired for their limited reactivity of about two, which promote formation of a linear epoxy polymer and prohibits formation of a cross-linked epoxy polymer. While not intending to be bound to a theory, it is believed that the resulting linear epoxy polymer formed by adding the hardener to the epoxide resin is responsible for the enhanced weatherability of this composition.

Acrylate Functional Groups

In some embodiments, compositions, dry-erase surface coatings, or dry-erase products can be formed from a resin part is functionalized with an epoxy group and an acrylate group. In some embodiments, compositions, dry-erase surface coatings, or dry-erase products can be formed from a resin part is functionalized with at least one epoxy group and at least one acrylate group.

In some embodiments, compositions, dry-erase surface coatings, or dry-erase products can be formed from a resin part that includes an acrylate material. Acrylates are polymers, and more specifically a type of vinyl polymer. Acrylates are made from acrylate monomers. Acrylate monomers are esters which contain at least one vinyl group, that is, two carbon atoms double-bonded to each other, directly attached to the carbonyl carbon, having the general formula $CH_2=CHCOOR$.

Epoxy Acrylate Compounds

In some embodiments, a resin part includes both epoxy functional groups and acrylate functional groups. In some embodiments, a resin part is or comprises an acrylate modified epoxy (herein an epoxy acrylate).

In some embodiments, a resin part including an epoxy acrylate has a viscosity of about 10 cPs @ 25° C. to about 1500 cPs @ 25° C. In some embodiments, a resin part including an epoxy acrylate has weight per equivalent of about 50-300. In some embodiments, a resin part including an epoxy acrylate has weight per equivalent of about 100-250. In some embodiments, a resin part including an epoxy acrylate has weight per equivalent of about 125-200.

In some embodiments, a commercially available resin part can be used in accordance with the present disclosure. A commercial epoxy acrylate resin part is for example Cargill ChemRes® 611 or Cargill ChemRes® 612.

Cure Part

In some embodiments, a resin part can then be mixed with a cure part. In some embodiments, a cure part may include at least one amine. In some embodiments, prior to combining, a first container includes a resin part, while a second container includes a cure part. In some embodiments, a catalyst can be combined and packaged with a cure part prior to mixing with a resin part.

In some embodiments, due to the unique properties of an epoxide ring structure, curing agents in a cure part can be either nucleophilic or electrophilic. Examples of nucleophilic agents include alcohols, phenols, a nonyl-phenol, amines, amino silanes, thiols, carboxylic acids, and acid anhydrides. Examples of electrophilic agents include aryl iodonium salts, aryl sulfonium salts, and latent acid catalysts (e.g., dibutyltin diacetatonate CAS 22673-19-4, aka 4-pentanedionato-o,o')-dibutyl bis(oc-6-11)-ti; dibutyl bis(2,4-pentanedionato-,o')-, (oc-6-11)-tin; di-n-butyltin bis(acetylacetonate), tech., 95%; di-n-butyltin bis(acetylacetonate); di-n-butyltin bis(2,4-pentanedionate); di-n-butyl bis(2,4-pentanedionate)tin; dibutyltin bis(acetylacetonate); dibutyltin bis(2,4-pentanedionate); dibutyl bis(pentane-2,4-dionato-o,o')tin; tin, dibutyl bis(2,4-pentanedionato-.kapppa.o,.kappa.o)-, (oc-6-11)-; Sn(acac)Bu2; dibutyl bis(pentan-2,4-dionato-o,Ozinn; bis-(2,4-pentanedionato)-dibutyltin; dibutyl bis(2,4-pentanedionato-o,o")-; di-n-butyltin bis (acetylacetonate), tech.; dibutyltin bis(2,4-pentanedionate), typically 95%; EINECS 245-152-0; tin, dibutyl bis(2,4-pentanedionato-o,o')-, (oc-6-11)-, (molecular formula=$C_{18}H_{32}O_4Sn$)). In some embodiments, curing agents can contain one or more nucleophilic groups. In some embodiments, curing of epoxy resins can lead to less amount of volatile products.

In some embodiments, a cure part includes an aliphatic amine. In some embodiments, a cure part includes a cycloaliphatic amine. In some embodiments, a cure part including an aliphatic amine or a cycloaliphatic amine may be modified by a phenol. In some embodiments, a cure part includes an amine that is functionalized with a phenol. In some embodiments, a phenol is or comprises a nonyl-phenol.

In some embodiments, when a cure part is modified by a phenol, a VOC of a combination or composition is less than about 25 g/L. In some embodiments, when a cure part is modified by a phenol, a VOC of a combination or composition is about 0 g/L.

In some embodiments, when a cure part is not modified by a phenol, a VOC of a combination or composition is less than about 140 g/L. In some embodiments, when a cure part is not modified by a phenol, a VOC of a combination or composition is less than about 100 g/L In some embodiments, when a cure part is not modified by a phenol, a VOC of a combination or composition is less than about 25 g/L. In some embodiments, when a cure part is not modified by a phenol, a VOC of a combination or composition is about 0 g/L.

In some embodiments, a cure part including an aliphatic amine or cycloaliphatic amine has a viscosity of about 10 cPs @ 25° C. to about 750 cPs @ 25° C.

In some embodiments, a cure part including a modified amine or cycloaliphatic amine has amine hydrogen equivalent weight or AHEW of about 25-250. In some embodiments, a cure part including a modified amine or cycloaliphatic amine has amine hydrogen equivalent weight or AHEW of about 50-175. In some embodiments, a cure part including a modified amine or cycloaliphatic amine has amine hydrogen equivalent weight or AHEW of about 40-125.

In some embodiments, a commercially available cure part can be used in accordance with the present disclosure. A commercial aliphatic amine or cycloaliphatic amine cure part is for example Cargill ChemCure® 250, Cargill ChemCure® 310M, Cargill ChemCure® 331, or Cargill ChemCure® 337.

Epoxy-Amine Stoichiometry

In some embodiments, provided epoxy acrylate polymers have epoxy groups and acrylate groups that are reactive to amines. In some embodiments, provided epoxy acrylate polymers have at least one epoxy group and at least one acrylate group that is reactive to an amine.

In some embodiments, for a resin part, there are a number epoxy equivalents per epoxy acrylate compound. In some embodiments, for a resin part, there a number acrylate equivalents per epoxy acrylate compound.

In some embodiments, when formulating a surface coating, there is a balance or approximate balance between amine curative equivalent parts, amines, cycloaliphatic amines and/or modified versions thereof and resin equivalent parts.

In some embodiments, for an epoxy resin, a number of equivalents equals a mass of a resin used/mass per epoxy group, for example, epoxide groups that are present on a resin.

In some embodiments, for an epoxy acrylate resin, the number of equivalents equals a mass of a resin used/mass per group(s) that is reactive with an amine, for example, epoxide groups or acrylate groups that are present on a resin.

In some embodiments, a cure part has an amine hydrogen equivalent weight (AHEW). The AHEW is equal to the molecular weight of the amine divided by the number of active hydrogens.

An example of such an amine is diethylenetriamine (abbreviated DETA and also known as 2,2'-Iminodi(ethylamine)[2]) is an organic compound with the formula $HN(CH_2CH_2NH_2)_2$.

The structure of DETA showing the active hydrogens is:

DETA has 5 hydrogens that can react with an epoxy group or an acrylate group. The AHEW of DETA is therefore equal to the molecular weight divided by the number of active hydrogens or AHEW of DETA=103/5=20.6.

In some embodiments, for curatives, an equivalent weight=grams/AHEW. To calculate a mass of curative you need for a 100 grams of a resin, use equation (1):

$$\frac{\text{mass of a resin}}{\text{EEW a resin}} \times AHEW \text{ of a curative} = \text{mass of curative for 100 g of resin} \quad (1)$$

In some embodiments, a resin part has an epoxy equivalent weight in a wide range depending on the epoxy ingredients in the resin part. In some embodiments, when a cure part is mixed with a resin part, a resulting mixture (e.g., a formulation or mixed composition) has an amine to epoxy acrylate equivalent weight ratio depending on an equivalent weight ratio of parts. In some embodiments, an equivalent weight is a ratio based on EEW and AHEW. In some embodiments, an amine to epoxy acrylate equivalent weight ratio of a formulation useful in accordance with the present disclosure is about 0.40, 0.45, 0.50, about 0.55, about 0.60, about 0.65, about 0.70, about 0.75, about 0.8, about 0.85, about 0.90, about 0.95, about 1.00, about 1.05, about 1.10, about 1.15, about 1.20, about 1.25, about 1.3, about 1.35, about 1.40, about 1.45, about 1.50, about 1.55, about 1.60, about 1.65, or about 1.70. In some embodiments, an amine to epoxy acrylate equivalent weight ratio of a formulation is in a range of about 0.4-0.5, 0.50 to about 0.60, about 0.60 to about 0.70, about 0.70 to about 0.80, about 0.80 to about 0.90, about 0.90 to about 1.00, about 1.00 to about 1.10, about 1.10 to about 1.20, about 1.20 to about 1.30, about 1.30 to about 1.40, about 1.40 to about 1.50, about 1.50 to about 1.640, or about 1.60 to about 1.70. In some embodiments, an amine to epoxy acrylate equivalent weight ratio of a formulation is in a range between (and optionally inclusive of) a lower value and an upper value. In some embodiments, a lower value is about 0.40, about 0.41, about 0.42, about, 0.43, about 0.44, about 0.45, about 0.46, about 0.47, about 0.48, about 0.49, about 0.50, about 0.51, about 0.52, about 0.53, about 0.54, about 0.55, about 0.56, about 0.57, about 0.58, about 0.59, about 0.60, about 0.61, about 0.62, about 0.63, about 0.64, about 0.65, about 0.66, about 0.67, about 0.68, about 0.69, about 0.70, about 0.71, about 0.72, about 0.73, about 0.74, about 0.75, about 0.76, about 0.77, about 0.78, about 0.79, about 0.80, about 0.81, about 0.82, about 0.83, about 0.84, about 0.85, about 0.86, about 0.87, about 0.88, about 0.89, about 0.90, about 0.91, about 0.92, about 0.93, about 0.94, about 0.95, about 0.96, about 0.97, about 0.98, about 0.99, about 1.00, about 1.01, about 1.02, about 1.03, about 1.04, about 1.05, about 1.06, about 1.07, about 1.08, about 1.09, or about 1.10, in some embodiments, an upper value is about 1.11, about 1.12, about 1.13, about 1.14, about 1.15, about 1.16, about 1.17, about 1.18, about 1.19, about 1.20, about 1.21, about 1.22, about 1.23, about 1.24, about 1.25, about 1.26, about 1.27, about 1.28, about 1.39, about 1.30, about 1.31, about 1.32, about 1.33, about 1.34, about 1.35, about 1.36, about 1.37, about 1.38, about 1.39, about 1.40, about 1.41, about 1.42, about 1.43, about 1.44, about 1.45, about 1.46, about 1.47, about 1.48, about 1.49, about 1.50, about 1.51, about 1.52, about 1.53, about 1.54, about 1.55, about 1.56, about 1.57, about 1.58, about 1.59, about 1.60, about 1.61, about 1.62, about 1.63, about 1.64, about 1.65, about 1.66, about 1.67, about 1.68, about 1.69, or about 1.70. In some embodiments, an amine to epoxy acrylate ratio in a provided formulation is within a range defined by any such lower value and upper value higher than a relevant lower value, inclusive of a relevant lower and upper values.

In some embodiments, relating to an amine to epoxy ratio, a mixing of a cure part with a resin part provides a weight percentage of each ingredient or part in a formulation. For example, a weight percentage of a resin part can be in a wide range. In some embodiments, a weight percentage of a resin part in a formulation used in accordance with the present disclosure can be or more than about 0.1 wt %, about 1 wt %, about 10 wt %, about 20 wt %, about 30 wt %, about 35 wt %, about 40 wt %, about 45 wt %, about 50 wt %, about 55 wt %, about 60 wt %, about 65 wt %, about 70 wt %, about 75 wt %, about 80 wt %, about 85 wt %, about 90 wt %, about 95 wt %. In some embodiments, a weight percentage of a resin part in a formulation can in a range of about 10 wt % to about 90 wt %, or about 80 wt % to about 90 wt %. In some embodiments, a weight percentage of a resin part in a formulation can in a range of any two values above.

In some embodiments, compositions are prepared by combining a resin part and a cure part. In some embodiments, provided compositions are designed including a resin part and a cure part that are selected such that, when combined together, they form a curable composition. In some embodiments, provided curable compositions are characterized in that when it is applied to a substrate, such compositions cure to form a surface coating that demonstrates at least one dry-erase characteristic. As noted above, in some embodiments, a curable composition that is capable of producing a surface coating having at least one dry-erase characteristics is formed from a combination having an equivalent weight ratio of a cure part to a resin part.

In some embodiments, a value of such an equivalent weight ratio has a tight tolerance level or error margin. When such a resin part and cure part are combined having an equivalent weight ratio that differs from such the value, the resulting composition cannot be used to form a surface coating. When such a resin part and cure part are combined having an equivalent weight ratio that differs from such the value, a cured surface coating forms, but it does not demonstrate dry-erase characteristics. In some embodiments, when such a resin part and cure part are combined having an equivalent weight ratio that differs from such the value, a combination results in an exothermic or violently exothermic reaction.

In some embodiments, when a resin part and a cure part combine to forms a composition that is useful in forming a surface coating having dry-erase characteristics. As noted above, such a combination has an equivalent weight ratio value; its amine to epoxy acrylate ratio. In some embodiments, an amine to epoxy acrylate ratio value has an associated tolerance level and or error margin. In some embodiments, a tolerance level and/or an error margin for an equivalent weight ratio is less than about 0.05% to about 15%. In some embodiments, such a tolerance level and/or an error margin less than about 0.1% to about 14.5%. In some embodiments, such a tolerance level and/or an error margin less than about 0.25% to about 14%. In some embodiments, such a tolerance level and/or an error margin less than about 0.5% to about 13.5%. In some embodiments, such a tolerance level and/or an error margin less than about 1% to about 12.5%. In some embodiments, such a tolerance level and/or an error margin less than about 0.05% to about 10%. In some embodiments, such a tolerance level and/or an error margin less than about 15%. In some embodiments, such a tolerance level and/or an error margin less than about 14%. In some embodiments, such a tolerance level and/or an error margin less than about 13%. In some embodiments, such a tolerance level and/or an error margin less than about 12%. In some embodiments, such a tolerance level and/or an error margin less than about 11%. In some embodiments, such a tolerance level and/or an error margin less than about 10%. In some embodiments, such a tolerance level and/or an error margin less than about 9%. In some embodiments, such a tolerance level and/or an error margin less than about 8%. In some embodiments, such a tolerance level and/or an error margin less than about 7%. In some embodiments, such a tolerance level and/or an error margin less than about 6%. In some embodiments, such a tolerance level and/or an error margin less than about 5%. In some embodiments, such a tolerance level and/or an error margin less than about 4%. In some embodiments, such a tolerance level and/or an error margin less than about 3%. In some embodiments, such a tolerance level and/or an error margin less than about 2%. In some embodiments, such a tolerance level and/or an error margin less than about 1%. In some embodiments, such a tolerance level and/or an error margin less than about 0.5%. When a resin part and a cure part are combined and it is outside of its equivalent weight ratio tolerance level and/or error margin an exothermic reaction may result.

Liquid Carrier

In some embodiments, one or more components, ingredients, and/or materials, utilized to produce compositions in accordance with the present disclosure can be in a liquid carrier. In some embodiments, a liquid carrier can be a result of mixing one or more starting materials that are present in a liquid physical state, and/or by combining one or more starting materials in a solid state with one or more starting materials in a liquid state. In some embodiments, some or all liquids used in accordance with the practice of the present disclosure are solventless. In some embodiments, at least one of one or more materials used in preparing such compositions can be in a liquid state, for example in a substantially solventless carrier. In some embodiments, liquid or non-liquid starting materials can be mixed into a liquid state starting material to form either part/component—whether the resin part, or the cure part, or both.

In some embodiments, one or more, one or materials are in form of resin solid (e.g., epoxy resin). In some embodiments, at least one of one or more materials can be provided in a liquid state. In some embodiments, one or more materials are provided in a solvent carrier, preferably using water as a solvent carrier, and less preferably using an organic solvent.

In some embodiments, where a solvent-based carrier is included, a solvent can include one or more alcohols (such as alkoxy alcohols, ketonic alcohols), bio-based solvents, esters (such as acetates), ethers, hydrocarbons (such as saturated hydrocarbons and unsaturated hydrocarbons), ketones, mineral spirits, or mixtures thereof. In some embodiments, any solvent comprises less than 10%, and more preferably less than 5%, and most preferably less than 1% by weight of the composition in its liquid state (before application to substrate and curing).

In some embodiments, non-limiting examples of such solvents can include: 2-butanol, 2-butoxyethanol, 2-ethylhexyl acetate, acetone, amyl acetate, coalescing agents, diacetone alcohol, diethylene glycol monopropyl ether, diisobutyl ketone, dipropylene glycol butoxy ether, corn oil, ethyl acetate, ethyl amyl ketone, ethyl benzene, glycol DB acetate, glycol ether DE acetate, glycol ether EB acetate, glycol ether EE acetate, glycol ether EM acetate, heptane, iso-amyl alcohol, isobutyl acetate, isobutyl isobutyrate, isopropyl acetate, isopropyl alcohol, methyl amyl alcohol, methyl amyl ketone, methyl iso-amyl ketone, methyl isobutyl ketone, methyl heptyl ketone, methanol, methyl ethyl ketone, naphtha (petroleum), n-butyl acetate, odorless mineral spirits, pentane, petroleum distillates, propanol, propyl acetate, propylene carbonate (4-ethyl-2-oxo-1,3-dioxolane), Stoddard solvent, sunflower oil, t-butyl acetate, toluene, vegetable oil, xylene, or mixtures thereof.

In some embodiments, component parts (prior to mixing) can have an extended shelf-life, e.g., up to about three years or even up to six years.

Additives

In some embodiments, a composition can be prepare by combining one or more materials, components, or parts, each independently or collectively including one or more substances including any or all of: an epoxy, an amine, and optionally other ingredients. In some embodiments, a surface coating can be formed from combining one or more materials, components, or parts, each independently or collectively including one or more substances including any or all of: an epoxy, an amine, and optionally other ingredients.

In some embodiments, a composition can further optionally include additives such as one or more of agents that enhance surface cleaning, anti-graffiti agents, biocides, coalescing agents, colorants, defoaming agents, extender pigment, masking agents, odor neutralizing agents, pigments (e.g. $TiO_2$), preservatives, promoting agents (e.g. adhesion promoters), rheology modifiers, surface additives, surfactants, thickening agents, UV absorbers, and/or wetting agents. In some embodiments, for example a composition that will form a non-clear surface, additives include pigments. In some embodiments, for example a composition that will form a clear surface, additives do not include pigments.

In some embodiments, a UV absorber is also provided, in a cure part. In some embodiments, a UV absorber is also provided, in a resin part. In some embodiments, a UV absorber is provided as a sebacate, such as 1,2,2,6,6-pentamethyl-4-piperidyl sebacate (CAS 41556-26-7).

White surface coatings may be preferable for "white boards." In some embodiments, a surface coating can be produced in any desirable color, such as by an addition of colorants and/or pigments to a liquid state composition before curing.

Compositions Substantially Free of Dyes, Pigments, and/or Opacifying Agents

The present disclosure recognizes that it is common in the art to develop colored coatings through use of both an opacifying agent (which renders a composition including it substantially white) and also a pigment (which imparts color to the composition). In some embodiments, the present disclosure provides compositions that are substantially free of dyes, opacifying agents, or pigments. In some embodiments, clear compositions whose attributes are defined and described herein include those that are substantially free of one or more pigments, one or more opacifying agents, or both, and specifically include compositions that are substantially free of any pigment and any opacifying agent (i.e., are, and/or cure to be, clear). Indeed, the present disclosure encompasses the surprising finding that compositions as described herein cure to become surface coatings characterized by one or more dry-erase characteristics without adjustment of such additives.

In some embodiments, opacifying agents, and particularly titanium oxide opaciying agents, interfere with curing of compositions. For example, in some embodiments, such opacifying agents can sometimes react themselves react with chemical moieties or functional groups that would otherwise participate in curing of a composition as provided herein. In some embodiments, components of a coating composition therefore must be adjusted to account for an opacifying agent when such an opacifying agent is removed or a level of such an opacifying agent is changed. In some embodiments, when such an opacifying agent is removed, adjusting a curative portion, for example to a higher amount may be useful to maintain a cure ratio and produce a surface coating having dry-erase character.

The present disclosure provides that certain previously described curable compositions that are characterized by particular write erase characteristics are sufficiently stable with respect to such write-erase characteristics that they maintain such characteristics independent of presence or level of an opacifying agent, and particularly of a titanium oxide opacifying agent.

The present disclosure therefore confirms and supports utility and value of such curable compositions, and furthermore provides description of those embodiments of such compositions that are substantially free of any opacifying agent (or at least are substantially free of a titanium oxide opacifying agent). The present disclosure demonstrates that such opacifying-agent-free embodiments are characterized by a surprising and unexpected feature of maintaining one or more dry-erase characteristics observed in an otherwise-identical opacifying-agent-containing composition. In some embodiments, such compositions have additional desirable attributes such that they can cure to form a clear coating. In some embodiments, such compositions can therefore convert a surface of any color into a dry-erase surface.

Catalyst

In some embodiments, a catalyst is included. In some embodiments, a catalyst is included in at least one of a resin part or cure part, or both. In some embodiments, one or more catalysts can be added in a resin part. In some embodiments, one or more catalysts can be added in a cure part. In some embodiments, no catalyst is present in a resin part, a cure part or any combination.

In some embodiments, a catalyst is or comprises tin. In some embodiments, a catalyst is or comprises dibutyltin dilaurate (DBTDL). In some embodiments, a catalyst is or comprises triethylamine. In some embodiments, a catalyst is or comprises a zinc catalyst or a zinc complex. In some embodiments, a catalyst is or comprises metals, such as aluminum, manganese, or calcium.

In some embodiments, suitable catalysts include organotin catalysts having a general formula, R5Sn(R6)(R7)(R8), are selected from a group consisting of alkyl, aryl, and alkoxy groups having up to eleven carbon atoms, and R7 and R8 can be selected from the same groups as R5 and R6, or from a group consisting of inorganic atoms such as halogens, sulphur or oxygen. In some embodiments, dibutyl tin dilaurate, dibutyl tin diacetate, organotitanates, sodium acetate, and aliphatic secondary or tertiary polyamines including propylamine, ethylamino ethanol, triethanolamine, triethylamine, and methyl diethanoi amine may be used alone or in combination to accelerate hydrolytic polycondensation of polysiloxane and silane compound.

In some embodiments, up to about 10 wt % (of total) catalyst may be added with a cure part to a resin part to speed drying and curing of formulations described herein. In some embodiments, a weight percentage of a catalyst in mixture of a cure part and a resin part can be about or less than about 10 wt %, about 9 wt %, about 8 wt %, about 7 wt %, about 6 wt %, about 5 wt %, about 4 wt %, about 3 wt %, about 2 wt %, about 1 wt %, about 0.5 wt %, about 0.2 wt %, or about 0.1 wt %. In some embodiments, a weight percentage of a catalyst in mixture of a cure part and a resin part can be in a range of 1-0.1 wt %. In some embodiments, a weight percentage of a catalyst in mixture of a cure part and a resin part can be in a range of about 10 to about 0.1 wt %, about 7 to about 0.5 wt %, or about 5 to about 1 wt %. In some embodiments, a weight percentage of a catalyst in mixture of a cure part and a resin part can be in a range of any two values above.

Dry-Erase/Write-Erase Surface

In some embodiments, surface coatings are dry-erase.

In some embodiments, after curing, a resulting dry-erase surface can be marked with a marking material including a colorant and a solvent, and the marking material can be erased from a dry-erase surface to be effectively invisible (e.g., substantially invisible).

In some embodiments, surface coatings can provide writing surfaces that exhibit little or no image ghosting, even after prolonged normal use.

In some embodiments, surface coatings can resist yellowing, as determined by ASTM method G-154, for an extended period of time (e.g., up to 2000 hours or even up to 5000 hours).

In some embodiments, a surface coating can be hard. In some embodiments, a surface coating can have a high chemical resistance. In some embodiments, a surface coating can be substantially impervious to organic solvents and/or inks. In some embodiments, a surface coating can have a low porosity. In some embodiments, a surface coating can have a low roughness. In some embodiments, a surface coating can be impact resistant. In some embodiments, a surface coating is scratch and abrasion resistant. In some embodiments, a surface gloss of a surface coating can be readily adjusted. In some embodiments, a writing surface of a surface coating can be projectable. In some embodiments, a surface coating can be relatively low cost.

Figure 2:
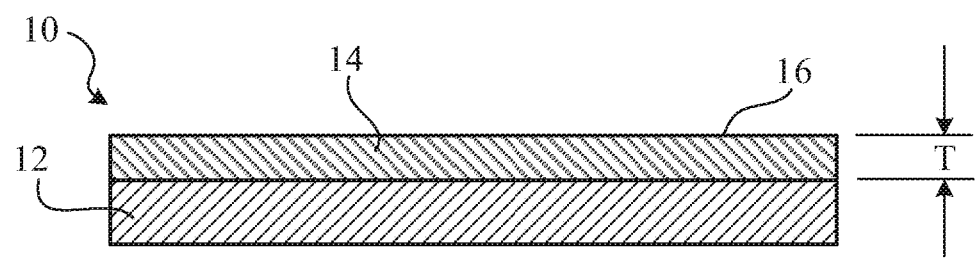
FIG. 2 depicts a cross-sectional view of a dry-erase product of FIG. 1, taken along 1A-1A.
Figure 3:
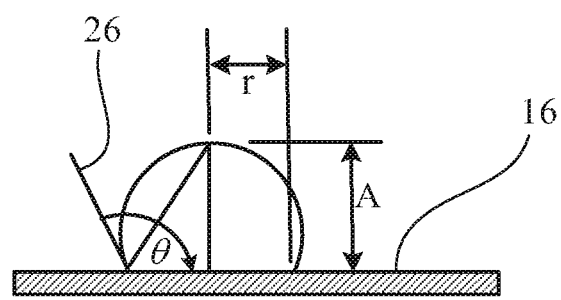
FIG. 3 depicts a cross-sectional view of a droplet of water on a coating and illustrates a method for determining contact angle.

Referring to FIG. 1 and FIG. 2, a dry-erase product includes a substrate and a surface coating, for example, a cured composition that is extended upon a substrate. In some embodiments, a surface coating has at least one dry-erase characteristic. In some embodiments, when a dry-erase surface coating is marked with a marking material, such a marking material can be erased to be effectively (e.g., substantially) invisible, resulting in little or no ghosting, even after prolonged normal use. In some embodiments, prolonged normal use, for example, is after at least about 10 cycles, for example, after about 50 cycles, after about 100 cycles, after about 500 cycles, after about 1,000 cycles, after about 2,000 cycles, after about 3,000 cycles, after about 4,000 cycles, after about 5,000 cycles, after about 6,000 cycles, after about 7,000 cycles, after about 8,000 cycles, or after about 9,000 cycles) of writing and erasing at a same position.

In some embodiments, visibility, or the lack thereof, of an erasing can be determined by measuring a color change (Delta E, $\Delta E$) on a dry-erase surface using a spectrophotometer (such as the SP-62 portable spectrophotometer available from X-Rite), after marking on the surface and erasing the marking. Color change is a composite of three variables, lightness (L*), red/green value (a*), and yellow/blue value (b*). Dry-erase characteristics of a dry-erase surface coating can be defined in terms of a $\Delta E$ value. In some embodiments, $\Delta E$ for a dry-erase surface 16 after 5,000 cycles (or even after 10,000 cycles) can be less than about 50, e.g., less than about 40, less than about 30, less than about 20, less than about 10, less than about 9, less than about 8, less than about 7, less than about 6, less than about 5, less than about 4, less than about 3, less than about 2, or less than about 1.

In some embodiments, ΔE for a dry-erase surface coating after 5,000 cycles (or even after 10,000 cycles) can be in a range of about 0.1 to about 10.0, e.g., about 0.1 to about 0.5, about 0.5 to about 1.0, about 1.0 to about 1.5, about 1.5 to about 2.0, from about 2.0 to about 2.5, about 2.5 to about 3.0, about 3.0 to about 3.5, about 3.5 to about 4.0, about 4.0 to about 4.5, about 4.5 to about 5.0, about 5.0 to about 5.5, about 5.5 to about 6.0, about 6.0 to about 6.5, about 6.5 to about 7.0, about 7.0 to about 7.5, about 7.5 to about 8.0, about 8.0 to about 8.5, about 8.5 to about 9.0, about 9.0 to about 9.5, or about 9.5 to about 10.0.

In some embodiments, dry-erase characteristics may be evaluated based on the differences in L* (ΔL*), without attribution to color differences. In some embodiments, such an evaluation can be combined with an assessment of progressive abrasion of surface coating with an abrader, such as the Taber abrader 4360. In some embodiments, for example, abrasion of a coating can be performed similar to an ASTM Method D4060. In some embodiments, dry-erase characteristics as a function of abrasion can be determined by abrading a dry-erase surface coating for a certain number of cycles and then measuring a change in lightness (ΔL*) value after marking on a surface followed by erasing a marking. In some embodiments, a substrate with a cured coating can be loaded on an abrader and abrasive wheels can be rotated on a dry-erase surface coating for a certain number of cycles, for example, about 50 cycles, about 100 cycles, about 150 cycles, about 200 cycles, about 500 cycles, or about 1,000 cycles. In some embodiments, after each abrasive cycle, a spectrophotometer (such as the SP-62 portable spectrophotometer available from X-Rite) can be used to measure a (L*) of an abraded area (L*a) and a dry-erase surface can be marked with a marking material (such as an Expo® 1 or Expo® 2, blue or black marker) and erased (such as with an Expo® felt dry-eraser). In some embodiments, for example, a spectrophotometer (such as the SP-62 portable spectrophotometer available from X-Rite) can be used to measure the (L*) value of an erased area (L*b). (ΔL*) can be determined from a difference of (L*a) and (L*b) values. In some embodiments, (ΔL*) for a dry-erase surface after 1,000 cycles can be at least about 20, e.g., at least about 30, at least about 40, at least about 50, at least about 60, at least about 65, at least about 70, at least about 75, at least about 80, at least about 85, at least about 90, or at least about 99. In some embodiments, a (ΔL*) value for a dry-erase surface after 1,000 cycles can be at least about 65, e.g., at least about 67, at least about 69, at least about 71, at least about 73, at least about 75, at least about 77, at least about 79, at least about 81, at least about 83, at least about 85, at least about 87, at least about 89, or at least about 91. In some embodiments, (ΔL*) for a dry-erase surface after 1,000 cycles can be from about 65 to about 70, from about 70 to about 75, from about 75 to about 80, from about 80 to about 85, from about 85 to about 90, from about 90 to about 95, or from about 95 to about 99. In some embodiments, when a dry-erase surface coating is marked with a marking material, it can be erased from its dry-erase surface to be effectively (e.g., substantially) invisible.

In some embodiments, a porosity of a coating (e.g., a cured coating) can determine an amount of marking material that can be trapped in the coating. While not intending to be bound by any theory, it is believed that lower porosity of coatings can lead to better dry-erase surfaces. In some embodiments, a coating can have a porosity in a range of about 1 percent and about 60 percent, e.g., about 2 percent and about 35 percent, about 2.5 percent and about 30 percent, or about 3 percent and about 20 percent. In some embodiments, a coating can have a porosity of less than about 40 percent, e.g., less than about 35 percent, less than about 30 percent, less than about 25 percent, less than about 20 percent, less than about 15 percent, less than about 10 percent, less than about 5 percent, or even less than about 2.5 percent.

In some embodiments, a coating (e.g., a cured coating) can have a porosity in a range of about 2 percent and about 45 percent, e.g., about 2.5 percent and about 35 percent, or about 3 percent and about 35 percent. In some embodiments, a coating can have a porosity of about 3 percent, about 33 percent, or about 34 percent.

In some embodiments, a surface coating (e.g., a cured coating) can have a Taber abrasion value of less than about 150 mg/thousand cycles, e.g., less than about 100 mg/thousand cycles, less than about 75 mg/thousand cycles, less than about 50 mg/thousand cycles, less than about 35 mg/thousand cycles, less than about 25 mg/thousand cycles, less than about 15 mg/thousand cycles, less than about 10 mg/thousand cycles, less than about 5 mg/thousand cycles, less than about 2.5 mg/thousand cycles, less than about 1 mg/thousand cycles, or even less than about 0.5 mg/thousand cycles. In some embodiments, maintaining a low Taber abrasion value can provide long-lasting durability to the coating, reducing the incidence of thin spots which could allow penetration of marking material through the coating and into the substrate.

In some embodiments, a surface coating (e.g., a cured coating) can have a Sward hardness of greater than about 10, e.g., greater than about 15, greater than about 25, greater than about 50, greater than about 75, greater than about 100, greater than about 120, greater than about 150, or even greater than about 200. Without being bound by theory, the inventors propose that maintaining a high Sward hardness provides long-lasting durability and scratch resistance to the coating. Marking material entrapped in scratches can be difficult to erase.

In some embodiments, a surface coating (e.g., a cured coating) can have a Sward hardness in a range of about 10 and about 75, e.g., about 15 and about 70 or about 15 and about 55. In some embodiments, the coating can have a Sward hardness of about 15, about 22 or about 25.

In some embodiments, a surface coating (e.g., a cured coating) can have a pencil hardness of about 6B to about 9H. In some embodiments, a pencil hardness is about 6B, about 5B, about 4B, about 3B, about 2B, about B, about HB, about F, about H, about 2H, about 3H, about 4H, about 5H, about 6H, about 7H, about 8H, or about 9H. In some embodiments, pencil hardness of disclosed surface coating may be in a range of any including or between any of these values. Without wishing to be bound to any specific theory, the present disclosure encompasses a recognition that a high pencil hardness, including or approaching 9H pencil hardness provides long-lasting durability and scratch resistance to the coating.

In some embodiments, a surface coating can have an elongation at break in a range of about 5 percent and about 400 percent, e.g., about 25 percent and about 200 percent, or about 50 percent and about 150 percent. In some embodiments, an elongation at break can be greater than about 10 percent, e.g., greater than about 25 percent, greater than about 50 percent, or even greater than about 100 percent. While not intending to be bound by theory, it is believed that maintaining high elongation at break provides long-lasting durability to the coating and it allows the coating to be stressed without forming cracks. In some embodiments, cracks can trap marking materials making erasure from surfaces difficult and, hence, decreasing longevity of dry-erase surface coatings and dry-erase products.

In some embodiments, a surface coating has a sag resistance of at least about 3 mils, e.g., about 4 mils, about 5 mils, about 6 mils, about 7 mils, about 8 mils, about 9 mils, about 10 mils, about 12 mils, about 14 mils, about 16 mils, about 18 mils, about 20 mils, about 22 mils, or about 24 mils. In some embodiments, a coating can have a sag resistance in a range of about 4 mils to about 24 mils, e.g., about 5 mils to about 20 mils, about 6 mils to about 18 mils, about 7 mils to about 16 mils, about 8 mils to about 14 mils, about 9 mils to about 12 mils, or about 10 mils to about 12 mils.

In some embodiments, a surface coating can have an average surface roughness (Ra) in a range of about 0.5 nm and about 7,500 nm, e.g., about 1 nm and about 6,000 nm, about 2 nm and about 5,000 nm, about 5 nm and about 2,500 nm, about 10 nm and about 1,500 nm, about 20 nm and about 1,000 nm or about 25 nm and about 750 nm. In some embodiments, a surface coating can have an average surface roughness (Ra) of less than about 7,500 nm, e.g., less than about 5,000 nm, less than about 3,000 nm, less than about 2,000 nm, less than about 1,000 nm, less than about 500 nm, less than about 250 nm, less than about 200 nm, less than about 100 nm, or even less than about 50 nm. In some embodiments, a surface coating can have an average surface roughness (Ra) in a range of about 75 nm and about 1,000 nm, e.g., about 100 nm and about 500 nm or about 150 nm and about 400 nm. In some embodiments, a dry-erase surface can have an average surface roughness (Ra) of about 150 nm, about 300 nm, or about 1,000 nm.

In some embodiments, a surface coating can have a maximum surface roughness (Rm) of less than about 10,000 nm, e.g., less than about 8,000 nm, less than about 6,500 nm, less than about 5,000 nm, less than about 3,500 nm, less than about 2,000 nm, less than about 1,000 nm, or less even than about 500 nm.

In some embodiments, a surface coating can have a flat finish (gloss below 15, measured at 85 degrees), an eggshell finish (gloss between about 5 and about 20, measured at 60 degrees), a satin finish (gloss between about 15 and about 35, measured at 60 degrees), a semi-gloss finish (gloss between about 30 and about 65, measured at 60 degrees), or gloss finish (gloss greater than about 65, measured at 60 degrees).

In some embodiments, a surface coating can have a 60 degree gloss in a range of about 0 and about 90, e.g., about 50 and about 85. In some embodiments, a dry-erase surface can have a 20 degree gloss in a range of about 10 and about 90, e.g., about 20 and about 45 or e.g. about 60-90. In some embodiments, a dry-erase surface can have a 85 degree gloss in a range of about 45 and about 90, e.g., about 75 and about 90. In some embodiments, a dry-erase surface can have a 20 degree gloss of about 12, about 23, or about 46; or a 60 degree gloss of about 52, about 66, or about 85; or a 85 degree gloss of about 64, about 78, or about 88.

In some embodiments, dry-erase character of a surface coating improves for a surface coating that is relatively hydrophilic and not very hydrophobic. In some embodiments, a resin part and a cure part can be chosen so that a cured coating has a surface that is relatively hydrophilic and not very hydrophobic. Referring to FIG. 2, in some embodiments, hydrophobicity of a coating surface that demonstrates at least one dry-erase characteristic is related to its wettability by a liquid, e.g., a water-based marking material. In some embodiments, it is desirable to quantify hydrophobicity of a dry-erase surface by a contact angle.

Generally, as described in ASTM D 5946-04, to measure contact angle, 0, for a liquid (such as water) on a surface coating that demonstrates dry-erase characteristics, an angle is measured between a surface coating that demonstrates dry-erase characteristics 16 and a tangent line 26 drawn to a droplet surface of the liquid at a three-phase point. Mathematically, 0 is 2× arctan(A/r), where A is a height of a droplet image, and r is half width at a base. In some embodiments, it can be desirable for a dry-erase surface to have contact angle, 0, measured using deionized water of less than about 150 degrees e.g., less than about 125 degrees, less than about 100 degrees, less than about 75 degrees, or even less than about 50 degrees. In some embodiments, it can be desirable for a dry-erase surface 16 to have contact angle 0 above about 35 degrees, e.g., above about 40 degrees, or above about 45 degrees.

In some embodiments, contact angle, 0, measured using deionized water, can be in a range of about 30 degrees and about 90 degrees, e.g., about 45 degrees and about 80 degrees, or about 39 degrees and about 77 degrees. In some embodiments, a contact angle can be about 40 degrees, for example, about 50 degrees, about 60 degrees, about 73 degrees, or about 77 degrees.

In some embodiments, a surface coating that demonstrates dry-erase characteristics can have a surface tension in a range of about 30 dynes/cm and about 72 dynes/cm, e.g., about 40 dynes/cm and about 60 dynes/cm. In some embodiments, a surface coating that demonstrates dry-erase characteristics can have a surface tension of about 22 dynes/cm, about 25 dynes/cm, about 30 dynes/cm, about 42 dynes/cm, about 44 dynes/cm, or about 56 dynes/cm. In some embodiments, a surface coating that demonstrates dry-erase characteristics can have a surface tension more than about 22 dynes/cm, about 25 dynes/cm, about 30 dynes/cm, about 42 dynes/cm, about 44 dynes/cm, or about 56 dynes/cm.

Substrates

In some embodiments, compositions as provided herein can be applied to many different types of substrates, including porous (e.g., paper) and non-porous substrates (e.g., densified ceramics).

In some embodiments, compositions can be applied on a substrate on-site rather than being manufactured in a factory.

In some embodiments, coatings can exhibit good adhesive strength to many substrates. In some embodiments, a substrate can be a flexible film or a rigid movable or immovable structure.

In some embodiments, surface coatings can be applied to various substrates including, but not limited to, chalkboards (e.g., blackboards), whiteboards, drywalls, gypsum boards, plaster, and painted walls. In some embodiments, a substrate could be a newly built structure or even an old and worn out chalkboard, blackboard, or whiteboard.

In some embodiments, a surface of a substrate can be cleaned by sanding it and priming it prior to application of a coating. In some embodiments, a surface can also be cleaned with a cleaning agent (e.g., acetone or a mild acid) to provide better adhesion of the coating to its surface.

In some embodiments, examples of substrates may include, but not limited to a cellulosic material (such as paper), fiber board (e.g., a whiteboard in which a composition can be extending upon a fiber board), densified ceramics, glass, gypsum board, metal (such as aluminum or stainless steel), particle board (e.g., a chalkboard or blackboard), plastics (such as high density polyethylene (HDPE), low density polyethylene (LDPE), or acrylonitrile, butadiene, styrene (ABS)-based material)), a polymeric material (such as a polyester or a polyamide), stone (such as granite), wall (such as plaster or painted wall), or wood.

In some embodiments, a dry-erase product can take the form of a whiteboard, in which a cured coating extends upon a fiberboard, can form a part of a wall e.g., of a structure, or can form a plurality of sheets, each sheet including a substrate (e.g., in the form of a paper) having a cured coating extending thereupon.

Markers

In some embodiments, a dry-erase product is marked with a dry-erase or write-erase marking material.

In some embodiments, a marking material includes a solvent including water, alcohols (such as alkoxy alcohols, ketonic alcohols), ketones, esters (such as acetates), mineral spirits, bio-based solvents, or mixtures thereof. In some embodiments, mixtures of any of a noted solvents can also be used, for example, mixtures of two, three, four or more of a noted solvents may be used.

In some embodiments, a marking material can include a colorant, such as additives, dyes, pigments, or solvents combinations thereof.

In some embodiments, bio-based solvents, include for example: vegetable oil, corn oil, sunflower oil are alternatives to conventional organic solvents and can be obtained from agricultural products. In some embodiments, such bio-based solvents decrease environmental impact.

In some embodiments, a marking material can be erased from a dry-erase surface to be effectively invisible by wiping marks with an eraser including a fibrous material (such as a paper towel, rag, or felt material).

In some embodiments, a marking material can be selected from any of an industry standard dry-erase markers.

Erasers

In some embodiments, a marking material can be erased from a dry-erase surface to be effectively (e.g., substantially) invisible by wiping marks with an eraser that includes a fibrous material. In some embodiments, for example, an eraser can be in the form of a disposable wipe, a cloth, or a supported (e.g., wood, plastic) felt.

In some embodiments, an eraser is dry.

In some embodiments, an eraser may include a solvent, such as water, alcohol (e.g., ethanol, n-propanol, isopropanol, n-butanol, isobutanol, benzyl alcohol), alkoxy alcohol (e.g., 2-(n-propoxy)ethanol, 2-(n¬butoxy)ethanol, 3-(n-propoxy)ethanol), ketone (e.g., acetone, methyl ethyl ketone, methyl n¬butyl ketone), ketonic alcohol (e.g., diacetone alcohol), ester (e.g., methyl succinate, methyl benzoate, ethyl propanoate), acetate (e.g., methyl acetate, ethyl acetate, n-butyl acetate, t-butyl acetate), mineral spirit, or mixtures thereof.

Examples of alcohols that can be used in the marking material or the eraser include ethanol, n-propanol, iso-propanol, n-butanol, iso-butanol, benzyl alcohol, 2-(n-propoxy)ethanol, 2-(n-butoxy)ethanol and 3-(n-propoxy) ethanol. Examples of ketones that can be used in the marking material or the eraser include acetone, methyl ethyl ketone and methyl n-butyl ketone. Examples of esters that can be used in the marking material or the eraser include methyl acetate, ethyl acetate, n-butyl acetate, and t-butyl acetate.

Dry-Erase/Write-Erase Product

In some embodiments, the present disclosure describes a dry-erase product including a cured coating extending upon a substrate and having a dry-erase surface. A coating composition described herein can be applied to a surface, so that the coating forms on the surface.

In some embodiments, coatings can be readily resurfaced.

Methods

Combining

In some embodiments, compositions are generated by combining component formulations that include at least one resin part and at least one cure part.

In some embodiments, when combined one or more materials, ingredients, and/or components form a composition. In some embodiments, a composition is a curable composition.

In some embodiments, one or more materials, ingredients, and/or components utilized to produce compositions in accordance with the present disclosure can be in a liquid carrier.

In some embodiments, at least one of the components of an at least one resin part and at least one cure part is in liquid form or in a liquid carrier. In some embodiments, a liquid carrier can be a result of mixing one or more starting materials that are present in a liquid physical state, and/or by combining one or more starting materials in a solid state with one or more starting materials in a liquid state. In some embodiments, a liquid or non-liquid starting material can be mixed into a liquid state starting material to form either part/component whether a resin part, or a cure part, or both.

In some embodiments, prior to combining, one or more materials including a resin part can be in a first container, and one or more materials including one or more cure parts can be in a second container. In some embodiments, a catalyst can be combined with a resin part prior to mixing with a cure part. In some embodiments, a catalyst can be combined with a cure part prior to mixing with a resin part. In some embodiments, no catalyst is present in a resin part, a cure part or any combination.

Materials/parts/compositions/formulations used in preparing dry-erase surface coatings in accordance with the present disclosure can be prepared by any of a variety of approaches, including often by standard techniques known to one of ordinary skill in the art. For example, in some embodiments, pre-determined amounts of one or more ingredient materials to be used can be mixed at required speeds in high shear dispersers until materials are homogeneously dispersed. In some embodiments, a degree of dispersion of materials and pigments can be determined with a Hegman gauge. In some embodiments, one or more additional ingredients including all remaining ingredients, if desired, can be introduced, for example at a letdown stage to obtain a final formulation appropriate for packaging. In some embodiments, for example, a two-component composition, two parts can be mixed thoroughly and can be allowed to stand for a period of time before being applied on a substrate. In some embodiments, prior to application on a substrate, compositions provided herein have a pot life.

In some embodiments, pot life is a time available for application of a composition. In some embodiments, pot life is a period before which a composition must be applied on a substrate. In some embodiments, pot life occurs, for example, when a mixture gels or when its viscosity exceeds a viscosity at which it can be properly mixed or applied. In some embodiments, compositions provided herein have a pot life, for example, up to about 6 hours after combining before applying such a composition.

Curing

In some embodiments, provided compositions are curable.

In some embodiments, after a resin part and a cure part are mixed together, they form a curable composition.

In some embodiments, curing of a curable composition is a process of setting a composition. In some embodiments, curing is a stage where fluids increase in viscosity prior to gellation and hardening. In some embodiments, curing is or comprises crosslinking of polymer chains. In some embodiments, setting comprises evaporating a solvent or liquid carrier to form a hardened surface coating. In some embodiments, curing is a process of setting a composition as provided herein to form a surface coating, for example on a substrate.

In some embodiments, setting comprises cross-linking functional groups, for example, reactive functional groups. In some embodiments, when a provided resin part and cure part are combined and mixed, they react with one another. In some embodiments, as provided herein, epoxy and acrylate groups present in a resin part are reactive with amines present in a cure part. Without wishing to be bound to a specific theory, it is believed curing occurs by cross-linking or other chemical and physical processes. While not intending to be bound by any theory, it is further believed that cross-linking between polymeric chains can influence certain unique properties of coatings.

In some embodiments, when a curable composition is applied to a substrate and cured it forms a surface with at least one dry-erase characteristic. In some embodiments, provided compositions that are characterized by an amine to epoxy acrylate equivalent weight in a range of about 0.4 to about 1.7. In some embodiments, when such a curable composition is applied to a substrate and cured it forms a surface with at least one dry-erase characteristic. In some embodiments, when provided compositions are extended upon a substrate, a surface coating as disclosed herein cures to form a dry-erase surface. In some embodiments, after curing, a surface coating is hard and smooth and substantially non-porous so that it can be marked with a marking material including a colorant and a solvent, and thereafter, a marking material can be erased from a dry-erase surface to be effectively invisible (e.g., substantially invisible).

In some embodiments, when provided compositions are characterized by an amine to epoxy acrylate equivalent weight outside a range of about 0.4 to about 1.7, they exothermically react. In some embodiments, when provided compositions are characterized by an amine to epoxy acrylate equivalent weight outside a range of about 0.4 to about 1.7, the exothermic reaction is a violent reaction. In some embodiments, when characterized by an amine to epoxy acrylate equivalent weight outside a range of about 0.4 to about 1.7, compositions are not curable.

An exothermic reaction is both unexpected and surprising. Prior epoxy based systems did not exhibit or even show any evidence of an exothermic reaction. Prior epoxy-based compositions when combined would extend on a substrate and cure to form a surface coating.

Moreover, prior systems typically failed to show dry-erase characteristic with compositions characterized by an amine to epoxy acrylate equivalent weight in a range of about 0.4 to about 1.7. That is, a cured surface coating formed from a composition characterized by an amine to epoxy acrylate equivalent weight outside a range of about 0.4 to about 1.7 but such a surface coating did not demonstrate at least one dry-erase characteristic.

The present disclosure encompasses a recognition that epoxy acrylate based resins are particularly reactive with aliphatic amines so that when combined to form compositions, those compositions generally are not stable or capable of forming cure surface coatings. The present disclosure also encompasses a recognition that when combined such compositions form surface coatings only some combinations demonstrate at least one dry-erase characteristic.

In some embodiments, a cure part has an effect of hardening a composition, whether by cross-linking or other chemical and physical processes. In some embodiments, curing includes and/or is performed by exposure to ambient conditions, heat, radiation, and/or by cross-linking (e.g., oxidative cross-linking).

In some embodiments, surface coatings do not require UV light or high-energy radiation for curing. In some embodiments, a surface coating cures on a substrate under ambient conditions.

In some embodiments, when extended on a substrate, a curable composition cures under ambient conditions to form a surface coating with at least one dry-erase characteristic. In some embodiments, a coating on a substrate can cure under ambient conditions in from about 4 hours to about a week, e.g., from about 4 hours to about 24 hours, from about 8 hours to about 20 hours, from about 12 hours to about 16 hours, from about 1 day to about 7 days, from about 2 days to about 6 days, or from about 3 days to about 5 days.

In some embodiments, a cured coating can be generally stable and also emit little or no VOCs after curing. In some embodiments, curing under ambient conditions can reduce environmental impact and can make materials that are safer to use than other compositions.

In some embodiments, when provided compositions are extended upon a substrate, a surface coating as disclosed herein cures to form a dry-erase surface. In some embodiments, a surface coating cures on a substrate via an energy cure, for example using some form of radiation, such as heat or light. In some embodiments, curing can be facilitated by ultraviolet (UV) light, thermal means, initiators, electron-beams, and combinations thereof. In some embodiments, heat, light, or radiation can be utilized to enhance a curing rate.

In some embodiments, surface coatings can cure rapidly, e.g., in less than about 12 to 60 hours, and more preferably between about 24 to about 48 hours, under ambient conditions.

In some embodiments, provided compositions cure when a resin part and a cure part are combined. In some embodiments, curing occurs over a period after combining. In some embodiments, provided compositions have a pot life. A pot life is a period during which materials must be applied on a substrate.

In some embodiments, compositions can have a pot life in a range of about 10 minutes to about 16 hours, for example, about 30 minutes to about 12 hours, about 60 minutes to about 8 hours, about 2 hours to about 4 hours, or about 1 hour to about 4 hours, or about 1 hour to about 2 hours. In some embodiments, where a composition is substantially solventless, a pot life after mixing a resin part and a cure part(s) is preferably in a range of about 4 to about 6 hours.

In some embodiments, materials can have a shelf life of greater than about 6 months, for example, about 12 months, about 18 months, about 24 months, about 30 months, or about 36 months.

Applying

In some embodiments, provided methods include applying a composition as disclosed herein. In some embodiments, the present disclosure describes methods of making a dry-erase product.

In some embodiments, applying comprises any means known in the art. In some embodiments, applying includes, for example: a brush, an HVLP sprayer, a roller, a spray (such as an aerosol spray), spray based on known airless sprayers, or using other types of applicators.

In some embodiments, a composition can be applied on a substrate in a single coat or multiple coats. In some embodiments, for many substrates, a single coat can provide an adequate dry-erase surface.

In some embodiments, a composition can be painted using a foam roller in a single coat. In some embodiments, a surface coating (e.g., before or after curing) can have a thickness, T (see FIG. 2), in a range of e.g., about 0.001 inch and about 0.125 inch, e.g., about 0.002 inch and about 0.1 inch, about 0.004 inch and about 0.08 inch, about 0.006 inch and about 0.06 inch, about 0.008 inch and about 0.04 inch, or about 0.01 inch and about 0.02 inch). In some embodiments, a surface coating (e.g., before or after curing) can have a thickness of greater than about 0.005 inch, e.g., greater than about 0.0075 inch or greater than about 0.010 inch. While not intending to be bound by any theory, it is believed that providing a uniform, adequate surface coating thickness, T, reduces a likelihood of thin or uncoated substrate portions where marking materials might penetrate.

In some embodiments, surface coatings can have a reduced tendency to run even when applied upon a vertical substrate.

In some embodiments, provided methods include preparing a substrate for application of a composition. In some embodiments, preparing includes, cleaning a substrate. In some embodiments, a substrate can be cleaned by sanding it and priming it prior to application of a coating. In some embodiments, a surface can also be cleaned with a cleaning agent (e.g., acetone or a mild acid) to provide better adhesion of the coating to its surface. In some embodiments, a substrate surface requires no preparation prior to application.

In some embodiments, a surface coating (e.g., a cured coating) formed by applying a composition in a liquid-based carrier can have a sufficient viscosity such that an applied coating does not run soon after it is applied or during its curing. In some embodiments, solution viscosity should be sufficient to permit easy application. In some embodiments, an applied solution can have a viscosity at 25° C. in a range of about 75 mPas and about 20,000 mPas, e.g., about 200 mPas and about 15,000 mPas, about 1,000 mPas and about 10,000 mPas, or about 750 mPas and about 5,000 mPas.

EXEMPLIFICATION

The following examples illustrate some embodiments and aspects of the invention. It will be apparent to those skilled in the relevant art that various modifications, additions, substitutions, and the like can be performed without altering the spirit or scope of the invention, and such modifications and variations are encompassed within the scope of the invention as defined in the claims which follow. The following examples do not in any way limit the invention.

Example 1

Materials and Methods

In some embodiments, for testing, a surface coating (e.g., a cured coating) can be made by casting a material on a fluoropolymer substrate and then curing a material so that it can have a dry thickness of about 0.002 inch. A cured sample can then be removed from a fluoropolymer substrate to provide a test specimen. Testing can be performed at 25° C. Elongation at break can be measured using ASTM method D-882; porosity can be measured using mercury porosimetry (suitable instruments available from Micromeritics, Norcross, Ga., e.g., Micromeritics Autopore IV 9500); surface roughness can be measured using atomic force microscopy (AFM) in tapping mode using ASME B46.1 (suitable instruments, e.g., WYKO NT8000, are available from Park Scientific); Taber abrasion resistance can be measured according to ASTM method D-4060 (wheel CS-17, 1 kg load) and Sward hardness can be measured according to ASTM method D-2134 (Sward Hardness Rocker Model C). VOC level(s) can be determined using the EPA Method 24. Gloss can be measured using ASTM method D-523-89 (BYK Tri-Gloss Meter Cat. No. 4525). Contact angle can be measured with deionized water using the dynamic contact angle method (Angstroms Model FTA 200) using ASTM method D-5946-04. Sag resistance can be measured using ASTM method D4400 which can be performed by obtaining a draw-down and measuring visually by comparison with standard ASTM pictures. Surface tension can be measured using AccuDyne Marking Pens. Stormer Viscosity can be measured on a Brookfield Viscometer by ASTM method D-562 and reported in Kreb units (Ku).

Example 2

Materials and Methods

A practical method was developed to determine the soak time of each formulation and thereby evaluate dry-erase performance.

Samples were painted using a standard nap roller on a substrate and allowed to cure for seven days.

Determining superior vs. inferior dry-erase performance includes writing using common commercial dry-erase markers and erasing on small scale samples of a dry-erase product samples made from provided dry-erase compositions. Dry-erase markers were applied to cured paint, to mark a substrate. Each individual marker was applied in an area roughly two inches wide and six inches long. After thirty minutes, a half inch by width of the marking was removed with a dry-erase cloth. Cured paint was inspected for marking eraseability, staining, and/or ghosting from its surface every seven days or until failure was noted.

Eraseability demonstrates an ability of a conventional dry-erase marker to be completely remove after application to the coating surface When a conventional dry-erase marker leaves a permanent mark on a dry-erase surface coating after steps of marking a surface coating and removal (i.e. attempted removal), the surface coating is stained.

Eraseability and staining were generally simultaneously evaluated according to the following subjective numerical value:

0—Marker does not erase well at all and leaves a substantial permanent stain

1—Marker is very difficult to remove and leaves some permanent residue

2—Marker demonstrates substantial difficulty in erasing but leaves little to no permanent staining 3—Marker requires moderate effort to erase but leaves no permanent stain 4—Eraseability of marker is very good and requires only slight effort to completely removing marking.

5—Eraseability of marker is excellent—all markings are completely removed with very little effort.

Following application and removal of a conventional dry-erase marker, ghosting demonstrates whether there is a visible "ghost" of the original mark left on the dry-erase coating.

Each of the above criteria were observed for performance based on a subjective evaluation. The purpose of this was to evaluate the dry-erase coating (formula) under "real world" conditions and usage. The first and second conditions (eraseability and staining) were paramount to achieving "acceptable" dry-erase performance. Only if a formulation passes the first of these conditions would it even be evaluated for ghosting.

Example 3

The present Example describes formulations of compositions with and without a pigment/opacifying agent as disclosed herein.

In the present example, a resin part is or comprises Bisphenol A, Epichlorohydrin $(C_{15}H_{16}O_2.C_3H_5ClO)_x$, which is commercially available under the tradename ChemRes® 628 from Cargill ("Resin 628").

In the present example, a cure part is or comprises a modified cycloaliphatic amine which is commercially available under the tradename ChemCure® 337 from Cargill ("Cure 337"). Cure 337 is a mixture that is or comprises <30 w/w % Nonyl Phenol, <40 w/w % Benzene-1,3-Dimethaneamine, <10 w/w % Isophoronediamine, and <20 w/w % Polypropylene Diamine.

Resin 628 has a weight equivalent part of 186. As noted above, its weight equivalent part is indicative of Resin 628's reactivity. That is, it provides the number of functional groups per gram which would undergo crosslinking reactions.

Cure 337 has an amine hydrogen equivalent weight of 71. As noted above, its hydrogen weight equivalent is indicative of Cure 337's reactivity. That is, it is an equivalent weight per active Hydrogen or the number of grams of hardener containing one equivalent of N—H groups.

In the present example, Resin 628 and Cure 337 were combined. Tables 1-3 illustrates mixtures made.

TABLE 1

| Sample Trial 1 | (grams) resin part | (grams) cure part | Amine/Epoxy Equivalent Weight Ratio |
|---|---|---|---|
| Mixture 1 | 40 | 46 | 2.43 |
| Mixture 2 | 40 | 54 | 2.85 |
| Mixture 3 | 40 | 70 | 3.70 |

Mixtures 1 through 3 were each exothermic. Mixture 3 was violently exothermic. Mixtures 1 through 3 were not useful for application.

TABLE 2

| Sample Trial 2 | (grams) resin part | (grams) cure part | Amine/Epoxy Equivalent Weight Ratio |
|---|---|---|---|
| Mixture 4 | 40 | 23 | 1.21 |
| Mixture 5 | 40 | 27 | 1.43 |
| Mixture 6 | 40 | 35 | 1.85 |

Mixtures 4 through 6 were capable of application on a substrate to form a surface coating.

Mixture 4 was not exothermic. But, Mixture 4 when coated on a surface presented issues with bubbles and dewetting.

For Mixtures 5 and 6, when a resin and a cure part were combined in a container, an extremely or violently exothermic reaction occurred. Mixtures 5 and 6 were exothermic had shortened pot life and had increased viscosity. Mixtures 5 and 6 were therefore not an ideal paintable product. Following release of energy or heat from the container, a volume of such a composition was cured in the container.

TABLE 3

| Sample Trial 3 | (grams) resin part | (grams) cure part | Amine/Epoxy Equivalent Weight Ratio |
|---|---|---|---|
| Mixture 7 | 40 | 12 | 0.63 |
| Mixture 8 | 40 | 14 | 0.74 |
| Mixture 9 | 40 | 17 | 0.90 |

Mixtures 7 through 9 showed adequate pot life (e.g. ideal typical paint application requirements), reduced viscosity (i.e. workability for easy application).

Mixtures 7 through 9 were capable of application on a substrate and cured to form surface coating. A surface coating formed from Mixtures 7 through 9 demonstrated dry-erase character. However, such surfaces demonstrated either cloudiness (i.e. the surface coating went from clear to cloudy after application); formed a skin on top; or bloomed (i.e. displayed an oil rising up on the surface during cure), thereby impeding dry-erase character.

A surface coating formed from Mixtures 7 through 9 demonstrated a soak value of 5 seven days after marking. That is, the mark could easily be erased from the surface. After 14 days, Mixtures 7 through 9 demonstrated a soak value of 1.

Example 4

The present Example describes formulations of compositions with and without a pigment/opacifying agent as disclosed herein.

In the present example, a resin part is or comprises Bisphenol F/Epichlorohydrin $(C_6H_6O.CH_2O)_x$, which is commercially available under the tradename ChemRes® 640 from Cargill ("Resin 640").

In the present example, a cure part is or comprises a modified cycloaliphatic amine which is commercially available under the tradename ChemCure® 337 from Cargill ("Cure 337"). Cure 337 is a mixture that is or comprises <30 w/w % Nonyl Phenol, <40 w/w % Benzene-1,3-Dimethaneamine, <10 w/w % Isophoronediamine, and <20 w/w % Polypropylene Diamine.

Resin 640 has a weight equivalent part of 170. As noted above, its weight equivalent part is indicative of Resin 640's reactivity. That is, it provides the number of functional groups per gram which would undergo crosslinking reactions.

Cure 337 has an amine hydrogen equivalent weight of 71. As noted above, its hydrogen weight equivalent is indicative of Cure 337's reactivity. That is, it is an equivalent weight per active Hydrogen or the number of grams of hardener containing one equivalent of N—H groups.

In the present example, Resin 640 and Cure 337 were combined. Tables 4-6 illustrate mixtures made.

TABLE 4

| Sample Trial 4 | (grams) resin part | (grams) cure part | Amine/Epoxy Equivalent Weight Ratio |
|---|---|---|---|
| Mixture 10 | 40 | 19.0 | 1.14 |
| Mixture 11 | 40 | 22.6 | 1.35 |
| Mixture 12 | 40 | 27.5 | 1.65 |

Mixtures 10 through 12 were each exothermic and not useful for application on a substrate and/or not capable of forming a surface coating.

TABLE 5

| Sample Trial 5 | (grams) resin part | (grams) cure part | Amine/Epoxy Equivalent Weight Ratio |
|---|---|---|---|
| Mixture 13 | 40 | 9.5 | 0.57 |
| Mixture 14 | 40 | 11.3 | 0.68 |
| Mixture 15 | 40 | 13.8 | 0.83 |

Mixtures 13 through 15 were capable of application on a substrate to form a surface coating. But the surface coating did not cure to form a usable dry-erase surface because of a presence of microbubbles, indicative of slight exothermic reaction and lower viscosity, which is inadequate for a paintable product.

TABLE 6

| Sample Trial 6 | (grams) resin part | (grams) cure part | Amine/Epoxy Equivalent Weight Ratio |
|---|---|---|---|
| Mixture 16 | 40 | 4.75 | 0.28 |
| Mixture 17 | 40 | 5.65 | 0.34 |
| Mixture 18 | 40 | 6.9 | 0.41 |

Mixtures 16 through 18 were capable of application on a substrate and cured to form surface coating. Mixtures 16 through 18 did not result in a surface having dry-erase character. Surfaces demonstrated either cloudiness (i.e. the surface coating went from clear to cloudy after application); formed a skin, or bloomed (i.e. displayed an oil rising up on the surface during cure); thereby impeding dry-erase character. Compositions showed reduced pot life (e.g. below typical paint application requirements), increased viscosity (i.e. reduced workability or increased difficulty to apply).

Mixtures 16 through 18 demonstrated a soak value of 1 seven days after marking. That is, the marked could not be erased from the surface.

Example 5

The present Example describes formulations of compositions with and without a pigment/opacifying agent as disclosed herein.

In the present example, a resin part is or comprises Bisphenol A/Epichlorohydrin (2,2-bis(acryloyloxymethyl) butyl acrylate) ($C_{15}H_{20}O_6$), which is commercially available under the tradename ChemRes® 611 from Cargill ("Resin 611"). That is, in addition to epoxy functional groups, the resin of the present example included acrylate functional groups.

In the present example, a cure part is or comprises a modified cycloaliphatic amine which is commercially available under the tradename ChemCure® 337 from Cargill ("Cure 337"). Cure 337 is a mixture that is or comprises <30 w/w % Nonyl Phenol, <40 w/w % Benzene-1,3-Dimethaneamine, <10 w/w % Isophoronediamine, and <20 w/w % Polypropylene Diamine.

Resin 611 has a weight equivalent part of 150. As noted above, its weight equivalent part is indicative of Resin 611's reactivity. That is, it provides the number of functional groups per gram which would undergo crosslinking reactions.

Cure 337 has an amine hydrogen equivalent weight of 71. As noted above, its hydrogen weight equivalent is indicative of Cure 337's reactivity. That is, it is an equivalent weight per active Hydrogen or the number of grams of hardener containing one equivalent of N—H groups.

In the present example, Resin 611 and Cure 337 were combined. Tables 7-9 illustrate mixtures made.

TABLE 7

| Sample Trial 7 | (grams) resin part | (grams) cure part | Amine/Epoxy Equivalent Weight Ratio |
|---|---|---|---|
| Mixture 19 | 40 | 13.5 | 0.71 |
| Mixture 20 | 40 | 17.2 | 0.91 |
| Mixture 21 | 40 | 21.5 | 1.14 |

Mixtures 19 through 21 were each mildly exothermic to exothermic and therefore not useful for application.

Mixtures 19 through 21 were mixed in a container and applied to a surface. However, the resultant surface coating appeared to give off heat. Once cooled, the resultant surfaces exhibited a frosted appearance and were rough to touch. These effects were more pronounces of a surface formed from Mixture 21 than Mixture 20 and more on Mixture 20 than Mixture 19.

TABLE 8

| Sample Trial 8 | (grams) resin part | (grams) cure part | Amine/Epoxy Equivalent Weight Ratio |
|---|---|---|---|
| Mixture 22 | 40 | 7.5 | 0.40 |
| Mixture 23 | 40 | 9.0 | 0.48 |
| Mixture 24 | 40 | 11.5 | 0.61 |

Mixtures 22 and 23 were capable of application on a substrate. Mixtures 22 and 23 formed a surface coating, however the surface was tacky after 48 hours and did not cure to form a usable dry-erase surface. Mixture 24 was tacky for 24 hours. Mixture 24 fully cured after 48 hours. Mixture 24 therefore did not exhibit an exothermic reaction and cured.

TABLE 9

| Sample Trial 9 | (grams) resin part | (grams) cure part | Amine/Epoxy Equivalent Weight Ratio |
|---|---|---|---|
| Mixture 25 | 40 | 11.5 | 0.61 |
| Mixture 26 | 40 | 13.5 | 0.71 |
| Mixture 27 | 40 | 17.2 | 0.91 |

An additives package, including for example surfactants, defoaming agents, and rheology modifiers was added to Mixtures 25 through 27.

With an additive package, Mixture 25 remained tacky for longer than 48 hours. Mixture 24 fully cured after 7 days.

Mixture 27 showed reduced pot life (e.g. below typical paint application requirements), increased viscosity (i.e. reduced workability or increased difficulty to apply). A surface formed from Mixture 27 exhibited a frosted appearance.

Mixtures 25 through 27 demonstrated a soak value of 5 seven days after marking. That is, the marked could be erased from the surface with ease. Mixtures 25 through 26 demonstrated a soak value of 5 at least 4 weeks after marking. Mixture 26 demonstrated a soak value of 5 at least 8 weeks after marking.

Example 6

The present Example describes formulations of compositions with a pigment/opacifying agent as disclosed herein.

In the present example, a resin part is or comprises Bisphenol A/Epichlorohydrin (2,2-bis(acryloyloxymethyl) butyl acrylate) ($C_{15}H_{20}O_6$), which is commercially available under the tradename ChemRes® 611 from Cargill ("Resin 611"). Similar to Example 5, the resin part included acrylate functional groups.

In the present example, a cure part is or comprises a modified cycloaliphatic amine which is commercially available under the tradename ChemCure® 331 from Cargill ("Cure 331") (3-aminomethyl-3,5,5-trimethylcyclohexylamine).

Resin 611 has a weight equivalent part of 150. As noted above, its weight equivalent part is indicative of Resin 611's reactivity. That is, it provides the number of functional groups per gram which would undergo crosslinking reactions.

Cure 331 has an amine hydrogen equivalent weight of 85. As noted above, its hydrogen weight equivalent is indicative of Cure 331's reactivity. That is, it is an equivalent weight per active Hydrogen or the number of grams of hardener containing one equivalent of N—H groups. When Cure 331 was combined with Resin 611, the reaction was less violent. This permitted using additional Cure 331.

In the present example, Resin 611 and Cure 331 were combined. Tables 10-12 illustrate mixtures made.

TABLE 10

| Sample Trial 10 | (grams) resin part | (grams) cure part | Amine/Epoxy Equivalent Weight Ratio |
|---|---|---|---|
| Mixture 28 | 40 | 25 | 1.10 |
| Mixture 29 | 40 | 27 | 1.20 |
| Mixture 30 | 40 | 29 | 1.28 |

Mixtures 28 through 30 were not exothermic. However, Mixtures 28 through 30 had too short of a pot life so that they were not useful for application.

TABLE 11

| Sample Trial 11 | (grams) resin part | (grams) cure part | Amine/Epoxy Equivalent Weight Ratio |
|---|---|---|---|
| Mixture 31 | 40 | 17.3 | 0.76 |
| Mixture 32 | 40 | 18.6 | 0.82 |
| Mixture 33 | 40 | 20.7 | 0.91 |

Mixtures 31 and 32 were capable of application on a substrate to form a surface coating. A surface coating of Mixtures 31 and 32 remained wet and did not cure to form a usable dry-erase surface. A surface coating made from Mixture 33 showed signs of hardening. While a surface coating made from Mixture 33 did not totally cure, it was capable of receiving a mark from a dry-erase marker.

TABLE 12

| Sample Trial 12 | (grams) resin part | (grams) cure part | Amine/Epoxy Equivalent Weight Ratio |
|---|---|---|---|
| Mixture 34 | 40 | 21.0 | 0.91 |
| Mixture 35 | 40 | 22.5 | 0.99 |
| Mixture 36 | 40 | 25.0 | 1.10 |

An additives package, including for example surfactants, defoaming agents, and rheology modifiers was added to Mixtures 34 through 36. With an additive package, Mixtures 34 through 36 were capable of application on a substrate and cured to form surface coating.

A surface coating formed from Mixture 34 was tacky after 24 hours and too slow to cure. A surface coating formed from Mixture 36 had reduced pot life was too fast to cure to be useful for application.

Mixtures 34 through 36 demonstrated a soak value of 5 seven days after marking. That is, the marked could be erased from the surface with ease.

Mixture 35 demonstrated ideal dry-erase characteristics. Mixture 35 demonstrated a soak value of 5 at least 8 weeks after marking.

Example 7

The present Example describes formulation of compositions without a pigment/opacifying agent as disclosed herein.

In the present example, a resin part is or comprises Bisphenol A/Epichlorohydrin (2,2-bis(acryloyloxymethyl) butyl acrylate) ($C_{15}H_{20}O_6$), which is commercially available under the tradename ChemRes® 611 from Cargill ("Resin 611"). Similar to Example 5, the resin part included acrylate functional groups.

In the present example, a cure part is or comprises a modified cycloaliphatic amine which is commercially available under the tradename ChemCure® 331 from Cargill ("Cure 331") (3-aminomethyl-3,5,5-trimethylcyclohexylamine).

Resin 611 has a weight equivalent part of 150. As noted above, its weight equivalent part is indicative of Resin 611's reactivity. That is, it provides the number of functional groups per gram which would undergo crosslinking reactions.

Cure 331 has an amine hydrogen equivalent weight of 85. As noted above, its hydrogen weight equivalent is indicative of Cure 331's reactivity. That is, it is an equivalent weight per active Hydrogen or the number of grams of hardener containing one equivalent of N—H groups. When Cure 331 was combined with Resin 611, the reaction was less violent. This permitted using additional Cure 331.

In the present example, Resin 611 and Cure 331 were combined. Tables 13-15 illustrate mixtures made.

TABLE 13

| Sample Trial 10 | (grams) resin part | (grams) cure part | Amine/Epoxy Equivalent Weight Ratio |
|---|---|---|---|
| Mixture 37 | 40 | 29.4 | 1.30 |
| Mixture 38 | 40 | 31.1 | 1.37 |
| Mixture 39 | 40 | 34.4 | 1.52 |

Mixtures 37 through 39 were not exothermic. However, Mixtures 37 through 39 had too short of a pot life so that they were not useful for application.

TABLE 14

| Sample Trial 11 | (grams) resin part | (grams) cure part | Amine/Epoxy Equivalent Weight Ratio |
|---|---|---|---|
| Mixture 40 | 40 | 19 | 0.84 |
| Mixture 41 | 40 | 22.5 | 0.99 |
| Mixture 42 | 40 | 25 | 1.10 |

Mixtures 40 and 41 were capable of application on a substrate to form a surface coating. A surface coating of Mixtures 40 and 41 remained wet and did not cure to form a usable dry-erase surface. A surface coating made from Mixture 42 showed signs of hardening. While a surface coating made from Mixture 42 did not totally cure, it was capable of receiving a mark from a dry-erase marker.

TABLE 15

| Sample Trial 12 | (grams) resin part | (grams) cure part | Amine/Epoxy Equivalent Weight Ratio |
|---|---|---|---|
| Mixture 43 | 40 | 21.0 | 1.06 |
| Mixture 44 | 40 | 22.5 | 1.18 |
| Mixture 45 | 40 | 25.0 | 1.27 |

An additives package, including for example surfactants, defoaming agents, and rheology modifiers was added to Mixtures 43 through 45. With an additive package, Mixtures 43 through 45 were capable of application on a substrate and cured to form surface coating.

A surface coating formed from Mixture 43 was tacky after 24 hours and too slow to cure. A surface coating formed from Mixture 45 had reduced pot life was too fast to cure to be useful for application.

Mixtures 43 through 45 demonstrated a soak value of 5 seven days after marking. That is, the marked could be erased from the surface with ease.

Mixture 44 demonstrated ideal dry-erase characteristics. Mixture 44 demonstrated a soak value of 5 at least 8 weeks after marking.

Example 8

The present Example describes formulation of compositions without an pigment/opacifying agent as disclosed herein.

In the present example, a resin part is or comprises Bisphenol A/Epichlorohydrin (2,2-bis(acryloyloxymethyl) butyl acrylate) ($C_{15}H_{20}O_6$), which is commercially available under the tradename ChemRes® 611 from Cargill ("Resin 611"). Similar to Example 6, a resin part included acrylate functional groups.

In the present example, a cure part is or comprises a modified cycloaliphatic amine which is commercially available under the tradename ChemCure® 331 from Cargill ("Cure 331") (3-aminomethyl-3,5,5-trimethylcyclohexylamine).

Resin 611 has a weight equivalent part of 150. As noted above, its weight equivalent part is indicative of Resin 611's reactivity. That is, it provides a number of functional groups per gram which would undergo crosslinking reactions.

Cure 331 has an amine hydrogen equivalent weight of 85. As noted above, its hydrogen weight equivalent is indicative of Cure 331's reactivity. That is, it is an equivalent weight per active hydrogen or the number of grams of hardener containing one equivalent of N—H groups.

When Cure 331 was combined with Resin 611, the reaction appeared less violent or volatile. A calmer, for example, less exothermic reaction permitted a use of additional Cure 331.

In the present example, Resin 611 and Cure 331 were combined. Tables 16-18 illustrate mixtures made.

TABLE 16

| Sample Trial 13 | (grams) resin part | (grams) cure part | Amine/Epoxy Equivalent Weight Ratio |
|---|---|---|---|
| Mixture 46 | 40 | 24.2 | 1.06 |
| Mixture 47 | 40 | 26.8 | 1.18 |
| Mixture 48 | 40 | 20.3 | 0.89 |

Mixtures 46 through 48 were not exothermic.

Mixtures 46 through 47 had short pot life such that they appear less ideal for large scale application.

Mixture 48, shows sufficient pot life for large scale application.

TABLE 17

| Sample Trial 14 | (grams) resin part | (grams) cure part | Amine/Epoxy Equivalent Weight Ratio |
|---|---|---|---|
| Mixture 49 | 40 | 21.0 | 1.06 |
| Mixture 50 | 40 | 22.4 | 0.98 |
| Mixture 51 | 40 | 20.3 | 0.89 |

Mixtures 49 and 50 were capable of application on a substrate to form a surface coating. A surface coating of Mixtures 49 and 50 cured but showed signs of shortened pot life such that they appear less ideal for large scale application.

A surface coating made from Mixture 51 showed increased pot life and open time, but still appear less ideal for large scale application. A surface coating made from Mixture 51 cure used more solvent, including an addition of 2 types of solvent to allow pot life and open time for large scale application.

A surface coating made from Mixture 51 was capable of receiving a mark from a dry-erase marker.

TABLE 18

| Sample Trial 15 | (grams) resin part | (grams) cure part | Amine/Epoxy Equivalent Weight Ratio |
|---|---|---|---|
| Mixture 52 | 40 | 21.0 | 1.06 |
| Mixture 53 | 40 | 22.4 | 0.98 |
| Mixture 54 | 40 | 20.3 | 0.89 |

A solvent package was added in varying ratios to accommodate both ideal potlife and ideal open time for large scale application. Mixtures 53 through 54 were capable of application on a substrate and cured to form surface coating.

Mixtures 53 through 54 demonstrated a soak value of 4 seven days after marking. That is, a write-erase mark on its surface was be erased with ease.

Example 9

The present Example describes formulation of compositions without an pigment/opacifying agent as disclosed herein.

In the present example, a resin part is or comprises Bisphenol A/Epichlorohydrin (2,2-bis(acryloyloxymethyl) butyl acrylate) ($C_{15}H_{20}O_6$), which is commercially available under the tradename ChemRes® 611 from Cargill ("Resin 611"). Similar to Example 5, a resin part included acrylate functional groups.

In the present example, a cure part is or comprises a modified cycloaliphatic amine which is commercially available under the tradename ChemCure® 331 from Cargill ("Cure 331") (3-aminomethyl-3,5,5-trimethylcyclohexylamine).

Resin 611 has a weight equivalent part of 150. As noted above, its weight equivalent part is indicative of Resin 611's reactivity. That is, it provides the number of functional groups per gram which would undergo crosslinking reactions.

Cure 331 has an amine hydrogen equivalent weight of 85. As noted above, its hydrogen weight equivalent is indicative of Cure 331's reactivity. That is, it is an equivalent weight per active Hydrogen or the number of grams of hardener containing one equivalent of N—H groups.

When Cure 331 was combined with Resin 611, the reaction appeared less violent or volatile. A calmer, for example, less exothermic reaction permitted a use of additional Cure 331.

In the present example, Resin 611 and Cure 331 were combined. Tables 19-20 illustrate mixtures made.

TABLE 19

| Sample Trial 16 | (grams) resin part | (grams) cure part | Amine/Epoxy Equivalent Weight Ratio |
|---|---|---|---|
| Mixture 55 | 40 | 22.4 | 0.98 |
| Mixture 56 | 40 | 20.3 | 0.89 |
| Mixture 57 | 40 | 19.5 | 0.86 |

Mixtures 55 through 57 were showed signs of foam, air entrapment, dewetting which not ideal for dry erase. However, Mixture 57 had acceptable potlife useful for application.

TABLE 20

| Sample Trial 17 | (grams) resin part | (grams) cure part | Amine/Epoxy Equivalent Weight Ratio |
|---|---|---|---|
| Mixture 58 | 40 | 20.3 | 0.89 |
| Mixture 59 | 40 | 19.5 | 0.86 |
| Mixture 60 | 40 | 18.8 | 0.83 |

Mixtures 58 and 59 were capable of application on a substrate to form a surface coating. Upon curing, a surface coating showed foam, air entrapment and dewetting.

An additive package of defoamers and surfactants were included to adjust, reduce, and/or eliminate such foaming, air entrapment, and dewetting. A surface coating of Mixtures 58-60 remained tacky. A surface coating made from Mixtures 58-60 were tacky, but were capable of receiving a mark from a dry-erase marker.

Mixtures 58-60 were usable as a dry-erase surfaces. Mixtures 58-60 demonstrated a soak value of 4 seven days after marking. That is, a write-erase mark on its surface was be erased with ease.

Mixtures 58-60 demonstrated a soak value of 4 at least 6 weeks after marking.

Example 10

The present Example describes formulation of compositions without an pigment/opacifying agent as disclosed herein.

In the present example, a resin part is or comprises Bisphenol A/Epichlorohydrin (2,2-bis(acryloyloxymethyl) butyl acrylate) ($C_{15}H_{20}O_6$), which is commercially available under the tradename ChemRes® 611 from Cargill ("Resin 611"). Similar to Example 5, the resin part included acrylate functional groups.

In the present example, a cure part is or comprises a modified cycloaliphatic amine which is commercially available under the tradename ChemCure® 331 from Cargill ("Cure 331") (3-aminomethyl-3,5,5-trimethylcyclohexylamine).

Resin 611 has a weight equivalent part of 150. As noted above, its weight equivalent part is indicative of Resin 611's reactivity. That is, it provides a number of functional groups per gram which would undergo crosslinking reactions.

Cure 331 has an amine hydrogen equivalent weight of 85. As noted above, its hydrogen weight equivalent is indicative of Cure 331's reactivity. That is, it is an equivalent weight per active Hydrogen or the number of grams of hardener containing one equivalent of N—H groups.

When Cure 331 was combined with Resin 611, the reaction appeared less violent or volatile. A calmer, for example, less exothermic reaction permitted a use of additional Cure 331.

In the present example, Resin 611 and Cure 331 were combined. Tables 21-22 illustrate mixtures made.

TABLE 21

| Sample Trial 18 | (grams) resin part | (grams) cure part | Amine/Epoxy Equivalent Weight Ratio |
|---|---|---|---|
| Mixture 61 | 40 | 20.3 | 0.89 |
| Mixture 62 | 40 | 19.5 | 0.86 |
| Mixture 63 | 40 | 18.8 | 0.83 |

Mixtures 61 through 63 were dry erase.

TABLE 22

| Sample Trial 19 | (grams) resin part | (grams) cure part | Amine/Epoxy Equivalent Weight Ratio |
|---|---|---|---|
| Mixture 64 | 40 | 20.3 | 0.89 |
| Mixture 65 | 40 | 19.5 | 0.86 |
| Mixture 66 | 40 | 18.8 | 0.83 |

Mixtures 64 through 66 were optimized for large scale application.

Sag resistance was at about 4 mils.

A 20 degree gloss was 80-90. 20 degree gloss was suitable for dry erase.

The surface tension was 32. Surface tension was suitable for dry erase.

Porosity, surface roughness and contact angle were measured within a range suitable for dry erase performance.

The pencil hardness 4H. Pencil hardness was suitable for dry erase.

Pot life is 45-75 minutes. Pot life was suitable for dry erase.

VOC is 50 g/L VOC. VOC was suitable for dry erase.

Mixtures 64 through 66 demonstrated a soak value of 5 seven days after marking. That is, a write-erase mark on its surface was be erased with ease.

Mixtures 64-66 demonstrated a soak value of 5 at least 5 months after marking.

Other Embodiments and Equivalents

While the present disclosures have been described in conjunction with various embodiments and examples, it is not intended that they be limited to such embodiments or examples. On the contrary, the disclosures encompass various alternatives, modifications, and equivalents, as will be appreciated by those of skill in the art. Accordingly, the descriptions, methods and diagrams of should not be read as limited to the described order of elements unless stated to that effect.

Although this disclosure has described and illustrated certain embodiments, it is to be understood that the disclosure is not restricted to those particular embodiments. Rather, the disclosure includes all embodiments that are functional and/or equivalents of the specific embodiments and features that have been described and illustrated.

What is claimed is:

1. A composition, comprising:
a resin part comprising an epoxy acrylate; and
a cure part comprising an aliphatic amine;
the resin part and the cure part being designed and selected such that, when combined together, they form a curable composition, the curable composition having an amine to epoxy acrylate equivalent weight in a range of about 0.4 to about 1.7,
wherein the curable composition is characterized in that when it is applied to a substrate, the curable composition cures under ambient conditions to form a surface coating that demonstrates at least one dry-erase characteristic, wherein the ambient conditions comprise a temperature of from about 45 to about 130 degrees Fahrenheit.

2. The composition of claim 1, wherein the cure part further comprises an opacifying agent or pigment.

3. The composition of claim 1, wherein the cure part and/or the resin part further comprises a catalyst.

4. The composition of claim 1, wherein the epoxy acrylate has a Bisphenol-A base.

5. The composition of claim 1, wherein the aliphatic amine is or comprises a cycloaliphatic amine.

6. The composition of claim 1, wherein the aliphatic amine is functionalized with a phenol.

7. The composition of claim 1, wherein the at least one dry-erase characteristic is selected from the group consisting of: an average surface roughness (Ra) of less than about 7,500 nm; a maximum surface roughness (Rm) of less than about 10,000 nm; a 60 degree gloss of higher than 0; a contact angle of less than about 150 degrees; a porosity of less than about 60 percent; an elongation at break of between about 10 percent and about 100 percent; a Sward hardness of greater than about 3; a pencil hardness of 6B or harder; a Taber abrasion value of less than about 150 mg/thousand cycles; a sag resistance of between about 4 mils and about 24 mils, and combinations thereof.

8. The composition of claim 1, wherein the surface coating is characterized in that, when written on with a marking material comprising a colorant and a solvent, the solvent comprising one or more of water, alcohols, alkoxy alcohols, ketones, ketonic alcohols, esters, acetates, mineral spirits, or mixtures thereof, the marking material is configured to be erased from the surface coating so as to be substantially invisible for more than 100 cycles of writing and erasing at a same position.

9. The composition of claim 1, wherein the surface coating has VOCs of less than 140 g/L.

10. The composition of claim 1, wherein the surface coating has VOCs of less than 100 g/L.

11. A method of forming a dry-erase product, the method comprising:
combining a resin part comprising an epoxy acrylate and a cure part comprising an aliphatic amine to form a composition, the composition having an amine to epoxy acrylate equivalent weight in a range of about 0.4 to about 1.7; and
applying the composition to a substrate and allowing the composition to cure under ambient conditions so as to form a surface coating that demonstrates at least one dry-erase characteristic, wherein the ambient conditions comprise a temperature of from about 45 to about 130 degrees Fahrenheit.

12. A dry-erase product formed from the method of claim 11.

13. The composition of claim 1,
wherein the composition is substantially free of any opacifying agent or pigment,
and wherein the surface coating is a clear surface coating.

14. The composition of claim 13, wherein the cure part and/or the resin part further comprises a catalyst.

15. The composition of claim 13, wherein the epoxy acrylate has a Bisphenol-A base.

16. The composition of claim 13, wherein the aliphatic amine is or comprises a cycloaliphatic amine.

17. The composition of claim 13, wherein the aliphatic amine is functionalized with a phenol.

18. The composition of claim 13, wherein the at least one dry-erase characteristic is selected from the group consisting of: an average surface roughness (Ra) of less than about 7,500 nm; a maximum surface roughness (Rm) of less than about 10,000 nm; a 60 degree gloss of higher than 0; a contact angle of less than about 150 degrees; a porosity of less than about 60 percent; an elongation at break of between about 10 percent and about 100 percent; a Sward hardness of greater than about 3; a pencil hardness of 6B or harder; a Taber abrasion value of less than about 150 mg/thousand cycles; a sag resistance of between about 4 mils and about 24 mils, and combinations thereof.

19. The composition of claim 13, wherein the surface coating is characterized in that, when written on with a marking material comprising a colorant and a solvent, the solvent comprising one or more of water, alcohols, alkoxy alcohols, ketones, ketonic alcohols, esters, acetates, mineral spirits, or mixtures thereof, the marking material is configured to be erased from the surface coating so as to be substantially invisible for more than 100 cycles of writing and erasing at a same position.

20. The composition of claim 13, wherein the surface coating has VOCs of less than 140 g/L.

21. The composition of claim 13, wherein the surface coating has VOCs of less than 100 g/L.

22. The dry-erase product of claim 12, wherein the composition is substantially free of any opacifying agent or pigment.

23. The method of claim 11, wherein the composition is substantially free of any opacifying agent or pigment.

24. A dry-erase product formed from the method of claim 23.

25. The dry-erase product of claim 12, wherein the surface coating emits no VOCs.

* * * * *